United States Patent
Lim et al.

(10) Patent No.: US 9,904,113 B2
(45) Date of Patent: Feb. 27, 2018

(54) ALIGNMENT COMPOSITION, LIQUID CRYSTAL DISPLAY PANEL AND METHOD OF MANUFACTURING SAME

(71) Applicant: Samsung Display Co., LTD., Yongin, Gyeonggi-Do (KR)

(72) Inventors: Ho Lim, Suwon-si (KR); Tae-Hoon Kim, Suwon-si (KR); Sung-Yi Kim, Hwaseong-si (KR); Tae-Min Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/812,177

(22) Filed: Jul. 29, 2015

(65) Prior Publication Data

US 2016/0033824 A1 Feb. 4, 2016

(30) Foreign Application Priority Data

Jul. 30, 2014 (KR) .......................... 10-2014-0097165
Jul. 13, 2015 (KR) .......................... 10-2015-0099015

(51) Int. Cl.
*C09K 19/00* (2006.01)
*G02F 1/1337* (2006.01)
(Continued)

(52) U.S. Cl.
CPC .... *G02F 1/133723* (2013.01); *C09K 19/3833* (2013.01); *C09K 19/3838* (2013.01);
(Continued)

(58) Field of Classification Search
CPC .. C09K 19/56; C09K 19/3477; C09K 19/348; C09K 19/3833; C09K 19/3838;
(Continued)

(56) References Cited

U.S. PATENT DOCUMENTS

2008/0160222 A1* 7/2008 Harding ................ B82Y 30/00
                                                          428/1.26
2011/0025967 A1* 2/2011 Sohn ................. G02F 1/133711
                                                          349/124
(Continued)

FOREIGN PATENT DOCUMENTS

KR   10-2005-0084525 A   8/2005
KR   10-2012-0008425 A   1/2012
(Continued)

OTHER PUBLICATIONS

EP 15178782.7 European Search Report dated Mar. 31, 2016 (8 pages).

*Primary Examiner* — Ruiyun Zhang
(74) *Attorney, Agent, or Firm* — Innovation Counsel LLP

(57) ABSTRACT

An alignment composition is presented that includes an alignment polymer and a reactive mesogen. The alignment polymer includes a polyimide backbone and a vertical alignment side chain combined with the polyimide backbone. The reactive mesogen may be represented by the formula

M5-M1-M2-M3-M4 in which M1 represents a divalent organic group including an aromatic ring group, M2 represents

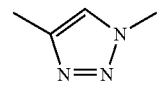

M3 represents a single bond, —O—, —O—$(CH_2)_a$—O—, or —$(CH_2)_a$—O—, wherein "a" represents an integer of 1 to 20, M4 represents an alkenyl group or an alkynyl group having a carbon number of 2 to 20 an alkenylcarbonyl group (Continued)

having a carbon number of 3 to 20, an alkenylcarbonyloxy group having a carbon number of 3 to 20, a an oxotetrahydrofuryl group having —(C=CH$_2$)— substituted for at least one —CH$_2$—, or an epoxy group. M5 represents -M2-M3-M4 or -M3-M4.

7 Claims, 6 Drawing Sheets

(51) Int. Cl.
    *C09K 19/56*     (2006.01)
    *C09K 19/38*     (2006.01)

(52) U.S. Cl.
    CPC ........ *C09K 19/56* (2013.01); *G02F 1/133788* (2013.01); *G02F 2001/133715* (2013.01); *G02F 2001/133726* (2013.01); *Y10T 428/10* (2015.01); *Y10T 428/1023* (2015.01)

(58) Field of Classification Search
    CPC ........ C09K 19/3866; C09K 2019/0448; C09K 2019/0444; G02F 1/133711; G02F 1/133723; G02F 2001/133723; Y10T 428/10; Y10T 428/1005; Y10T 428/1023; Y10T 428/31721

USPC ................. 428/1.1, 1.2, 1.26; 349/123, 127; 252/299.01, 299.61

See application file for complete search history.

(56) References Cited

U.S. PATENT DOCUMENTS

| | | | |
|---|---|---|---|
| 2013/0101755 A1* | 4/2013 | Lee | ................... G02F 1/133707 428/1.23 |
| 2015/0022750 A1 | 1/2015 | Ogawa et al. | |
| 2015/0362803 A1* | 12/2015 | Ahn | ................. G02F 1/133703 349/123 |

FOREIGN PATENT DOCUMENTS

| | | |
|---|---|---|
| KR | 10-2013-0057153 A | 5/2013 |
| KR | 10-2015-0078514 | 7/2015 |
| KR | 10-2015-0078515 | 7/2015 |
| KR | 10-2015-0083695 | 7/2015 |
| KR | 10-2015-0118659 A | 10/2015 |
| KR | 10-2016-0013367 | 2/2016 |
| WO | 2013-145369 A1 | 10/2013 |

\* cited by examiner

ALIGNMENT COMPOSITION, LIQUID CRYSTAL DISPLAY PANEL AND METHOD OF MANUFACTURING SAME

CROSS REFERENCE TO RELATED APPLICATION

This application claims priority to Korean Patent Application No. 10-2014-0097165, filed on Jul. 30, 2014, and Korean Patent Application No. 10-2015-0099015, filed on Jul. 13, 2015, and all the benefits accruing therefrom under 35 U.S.C. § 119, the contents of both of which are incorporated by reference herein in their entireties.

BACKGROUND

1. Field

The inventive concept relates to an alignment composition. More particularly, the inventive concept relates to an alignment composition capable of improving afterimage characteristics of a display panel, a display panel formed using the alignment composition, and a method of manufacturing a display panel using the alignment composition.

2. Description of the Related Art

Liquid crystal display apparatuses are one type of flat panel display (FPD). In a liquid crystal display apparatus, voltages are applied to liquid crystal molecules to adjust alignment of the molecules, thereby changing the optical characteristics of a liquid crystal cell, such as birefringence, optical activity, dichroism and light scattering, to display an image.

The liquid crystal display apparatus includes a display panel and a backlight assembly. Liquid crystal molecules of the display panel need to be aligned in a direction to have uniform brightness and high contrast ratio.

Recently, an alignment composition for liquid crystal molecules in a display panel (i.e., an alignment composition), which includes a reactive mesogen as a side chain of an alignment polymer, has been used to improve the transmissivity and the response speed of the liquid crystal display apparatus. However, when the reactive mesogen is included in the alignment polymer as a side chain of the alignment polymer, the degree of cross-linking may be reduced, and the mechanical strength of the reactive mesogen layer may be reduced. Thus, an afterimage may appear on a screen of a display panel.

BRIEF SUMMARY OF THE INVENTIVE CONCEPT

An alignment composition capable of improving afterimage characteristics (i.e., reducing or eliminating afterimage formation) is provided.

A display panel capable of improved afterimage characteristics and formed by using the alignment composition is also provided.

A method of manufacturing a display panel using the alignment composition is also provided.

In one aspect, an alignment composition includes an alignment polymer and a reactive mesogen. The alignment polymer includes a polyimide backbone and a vertical alignment side chain combined with the polyimide backbone. The reactive mesogen may be represented by the following Chemical Formula 1.

M5-M1-M2-M3-M4       <Chemical Formula 1>

In Chemical Formula 1, M1 represents a divalent organic group including an aromatic ring group. M2 represents

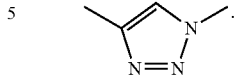

M3 represents a single bond, —O—, —O—(CH$_2$)$_a$—O—, or —(CH$_2$)$_a$—O—, wherein "a" represents an integer of 1 to 20. M4 represents an alkenyl group having a carbon number of 2 to 20 and including an unsaturated carbon bond as an end group, an alkynyl group having a carbon number of 2 to 20 and including an unsaturated carbon bond as an end group, an alkenylcarbonyl group having a carbon number of 3 to 20 and including an unsaturated carbon bond as an end group, an alkenylcarbonyloxy group having a carbon number of 3 to 20 and including an unsaturated carbon bond as an end group, a an oxotetrahydrofuryl group having —(C=CH$_2$)— substituted for at least one —CH$_2$—, or an epoxy group. M5 represents -M2-M3-M4 or -M3-M4.

In an exemplary embodiment, M1 represents

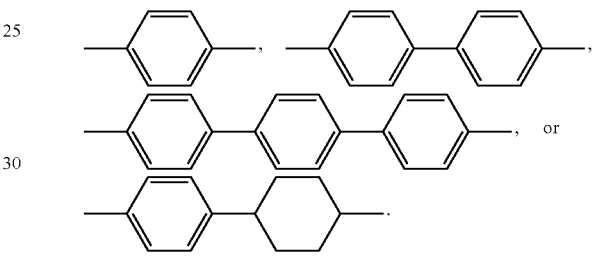

At least one hydrogen atom on a carbon ring of M1 may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group.

In an exemplary embodiment, the alignment polymer includes a repeating unit represented by the following Chemical Formula 2

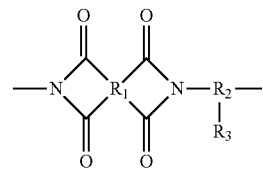

<Chemical Formula 2>

In Chemical Formula 2, R$_1$ represents a tetravalent organic group including an aromatic ring group or an aliphatic ring group. R$_2$ represents a trivalent organic group including an alkylene group having a carbon number of 1 to 20 or an aromatic ring group or an aliphatic ring group. R$_3$ represents -A1-B1-A2-B2-A3-C1. A1, A2 and A3 independently represent a single bond,

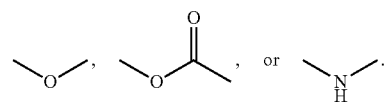

B1 and B2 independently represent a single bond, an alkylene group having a carbon number of 1 to 20,

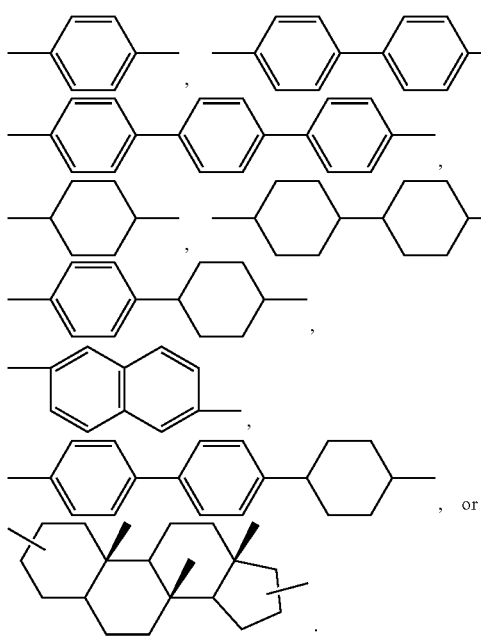

, or

When B1 or B2 represents an alkylene group having a carbon number of 2 to 20, at least one —CH$_2$— of the alkylene group may be substituted with —CH=CH— or —C≡C—. When B1 or B2 includes a carbon ring, at least one hydrogen atom on the carbon ring of B1 and B2 may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group. C1 represents an alkyl group having a carbon number of 1 to 20 and having a ring shape, a chain shape or a chain shape including a side chain.

In an exemplary embodiment, the alignment polymer further includes a photo-reactive side chain including a photo-reactive group as an end group, the photo-reactive group representing

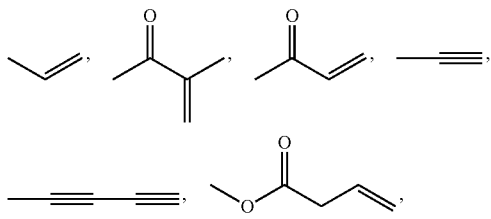

an epoxy group,

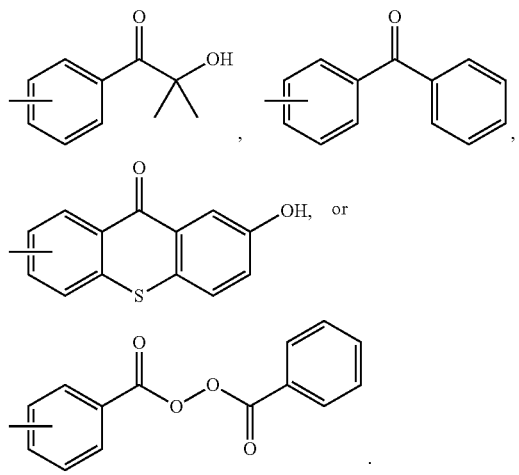

In another aspect, an alignment composition includes an alignment polymer and a reactive mesogen. The alignment polymer includes a polyimide backbone and a vertical alignment side chain combined with the polyimide backbone. The reactive mesogen may be represented by the following Chemical Formula 6.

<Chemical Formula 6>

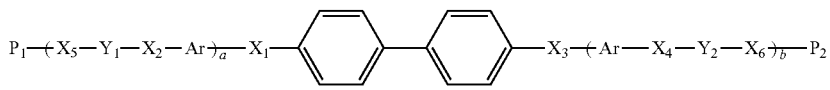

In Chemical Formula 6, at least one hydrogen atom in

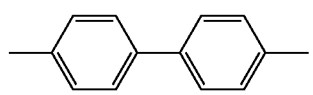

may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group. "a" and "b" independently represent 0, 1 or 2. Ar represents

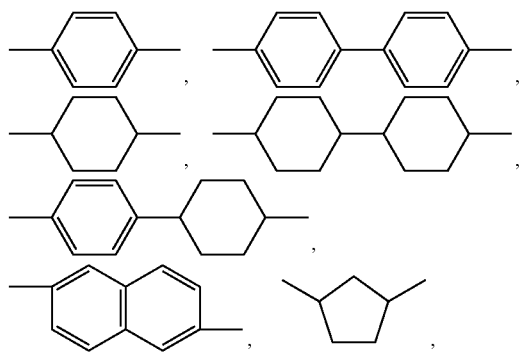

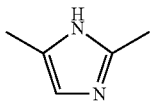 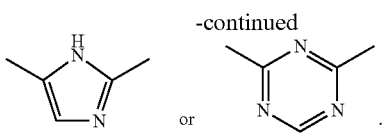

At least one hydrogen atom on a carbon ring or a hetero ring of Ar may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group. $X_1$, $X_2$, $X_3$, $X_4$, $X_5$ and $X_6$ independently represent a single bond,

—$CH_2$—, —C=C= or —C≡C—. $Y_1$ and $Y_2$ independently represent a single bond or an alkylene group having carbon atoms of 1 to 12. $P_1$ and $P_2$ independently represent an alkenyl group having a carbon number of 2 to 20 and including an unsaturated carbon bond as an end group, an alkynyl group having a carbon number of 2 to 20 and including an unsaturated carbon bond as an end group, an alkenylcarbonyl group having a carbon number of 3 to 20 and including an unsaturated carbon bond as an end group, an alkenylcarbonyloxy group having a carbon number of 3 to 20 and including an unsaturated carbon bond as an end group, a an oxotetrahydrofuryl group having —(C=$CH_2$)— substituted for at least one —$CH_2$—, or an epoxy group.

According to exemplary embodiments of the alignment composition, the reactive mesogen is separated from an alignment polymer. Thus, the degree of cross-linking of the reactive mesogen may be increased.

Furthermore, a photo-reactive side chain may be introduced to the alignment polymer to increase the degree of cross-linking of the reactive mesogen, and strength of the reactive mesogen layer.

BRIEF DESCRIPTION OF THE DRAWINGS

The above and other features of the inventive concept will become more apparent by describing in detailed example embodiments thereof with reference to the accompanying drawings, in which.

DETAILED DESCRIPTION OF THE INVENTIVE CONCEPT

Figure 1:
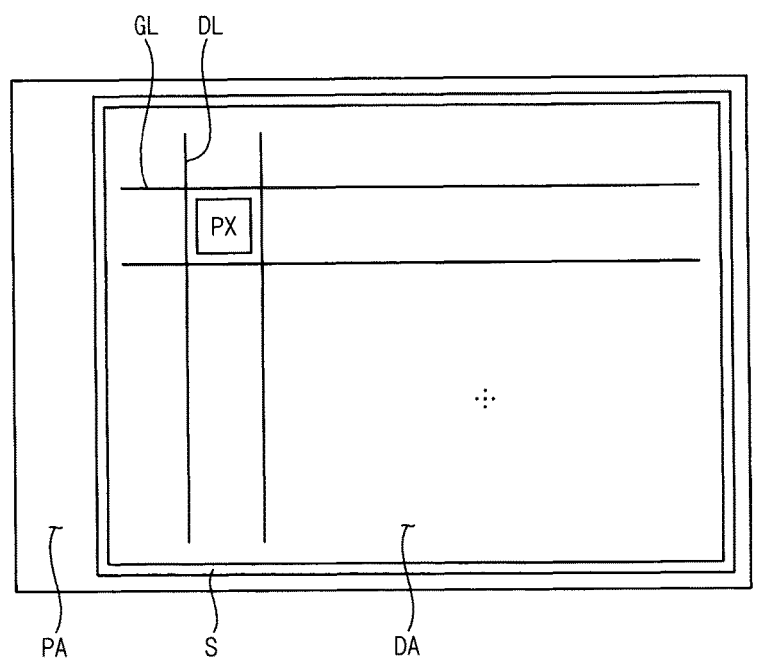
FIG. 1 is a plan view illustrating an example embodiment of a display panel.

Hereinafter, example embodiments of the inventive concept will be explained in detail with reference to the accompanying drawings.

An Alignment Composition

Embodiments of the alignment composition disclosed herein include an alignment polymer and a reactive mesogen. The alignment polymer includes a polyimide backbone and a vertical alignment side chain combined with (i.e., bonded to) the polyimide backbone. The reactive mesogen may be represented by the following Chemical Formula 1.

M5-M1-M2-M3-M4  <Chemical Formula 1>

In Chemical Formula 1, M1 represents a divalent organic group including an aromatic ring group having a substituted or non-substituted hydrogen atom. M2 represents

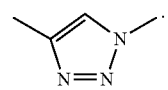

M3 represents a single bond, —O—, —O—$(CH_2)_a$—O—, or —$(CH_2)_a$—O—, wherein "a" represents an integer of 1 to 20. M4 represents an alkenyl group having a carbon number of 2 to 20 and including an unsaturated carbon bond as an end group, an alkynyl group having a carbon number of 2 to 20 and including an unsaturated carbon bond as an end group, an alkenylcarbonyl group having a carbon number of 3 to 20 and including an unsaturated carbon bond as an end group, an alkenylcarbonyloxy group having a carbon number of 3 to 20 and including an unsaturated carbon bond as an end group, a an oxotetrahydrofuryl group having —(C=$CH_2$)— substituted for at least one —$CH_2$—, or an epoxy group. M5 represents -M2-M3-M4 or -M3-M4.

For example, M1 may represent

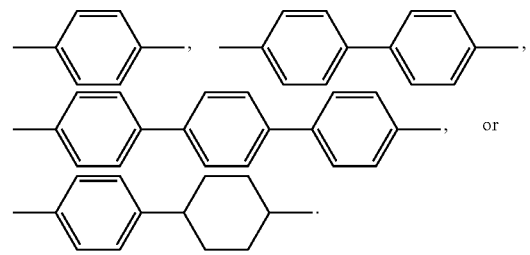

At least one hydrogen atom on a carbon ring of M1 may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group.

For example, M4 may represent

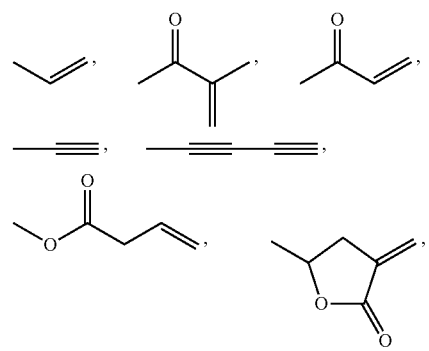

or an epoxy group.

For example, the reactive mesogen may include at least one of compounds represented by the following Chemical Formulas 1-1, 1-2, 1-3, 1-4, 1-5, 1-6, 1-7, 1-8, 1-9, 1-10, 1-11 and 1-12.

<Chemical Formula 1-1>

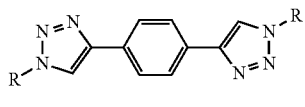

<Chemical Formula 1-2>

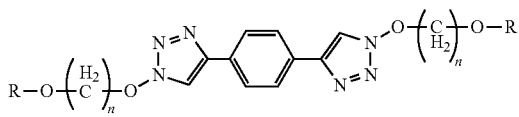

<Chemcial Formula 1-3>

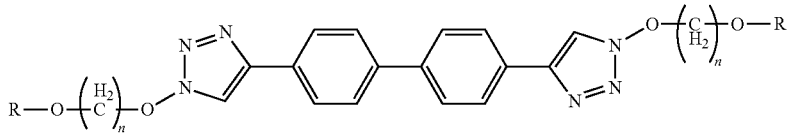

<Chemical Formula 1-4>

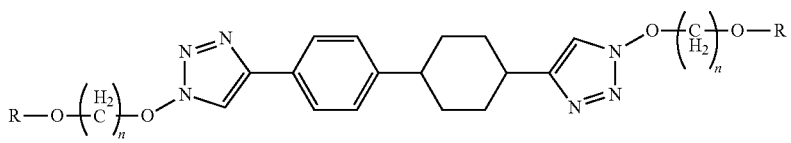

<Chemical Formula 1-5>

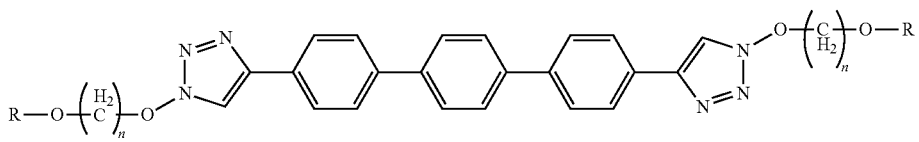

<Chemical Formula 1-6>

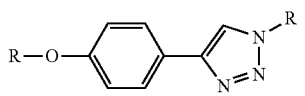

<Chemical Formula 1-7>

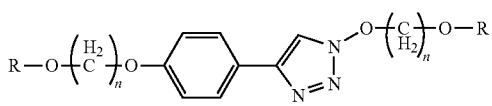

<Chemical Formula 1-8>

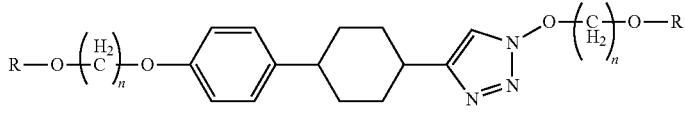

<Chemical Formula 1-9>

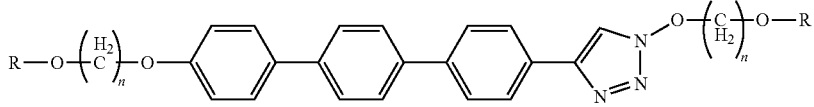

<Chemical Formula 1-10>

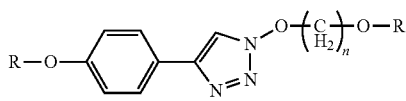

<Chemical Formula 1-11>

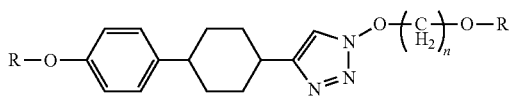

<Chemical Formula 1-12>

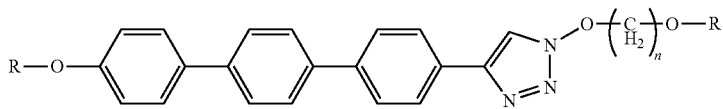

In Chemical Formulas 1-1, 1-2, 1-3, 1-4, 1-5, 1-6, 1-7, 1-8, 1-9, 1-10, 1-11 and 1-12, "n" independently represents an integer of 1 to 20, and R is same as M4 of Chemical Formula 1. At least one hydrogen atom of each phenylene group may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group.

For example, a reactive mesogen represented by Chemical Formula 1-1 and having a methacryloyl group as an end group may be prepared by the following reactions.

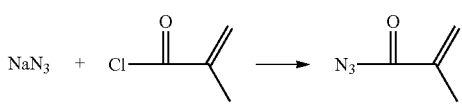

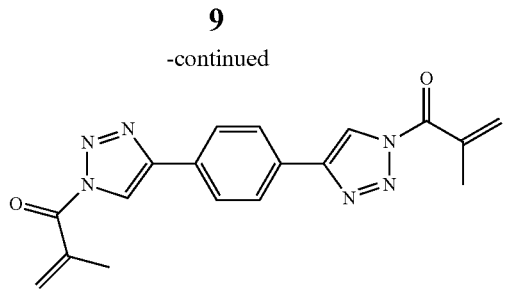

The alignment polymer includes a repeating unit represented by the following Chemical Formula 2. In Chemical Formula 2, $R_3$ may be a vertical alignment side chain.

<Chemical Formula 2>

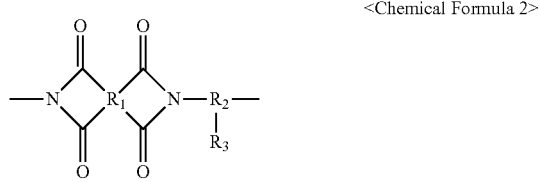

In Chemical Formula 2, $R_1$ represents a tetravalent organic group including an aromatic ring group or an aliphatic ring group, which has substituted or non-substituted hydrogen atoms. $R_2$ represents a trivalent organic group including an alkylene group having a carbon number of 1 to 20 or an aromatic ring group or an aliphatic ring group, which has substituted or non-substituted hydrogen atoms. $R_3$ represents -A1-B1-A2-B2-A3-C1. A1, A2 and A3 independently represent a single bond,

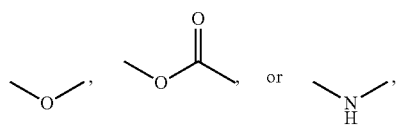

B1 and B2 independently represent a single bond, an alkylene group having a carbon number of 1 to 20,

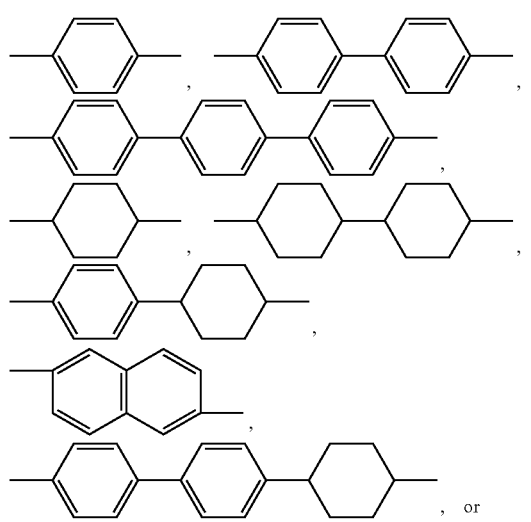

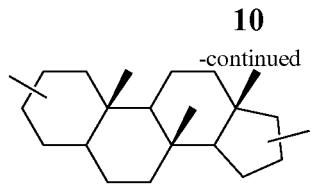

When B1 or B2 represents an alkylene group having a carbon number of 2 to 20, at least one —$CH_2$— of the alkylene group may be substituted with —CH=CH— or —C≡C—. When B1 or B2 includes a carbon ring, at least one hydrogen atom on the carbon ring of B1 and B2 may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group. C1 represents an alkyl group having a carbon number of 1 to 20 and having a ring shape, a chain shape or a chain shape including a side chain.

For example, in Chemical Formula 2, $R_1$ may represent

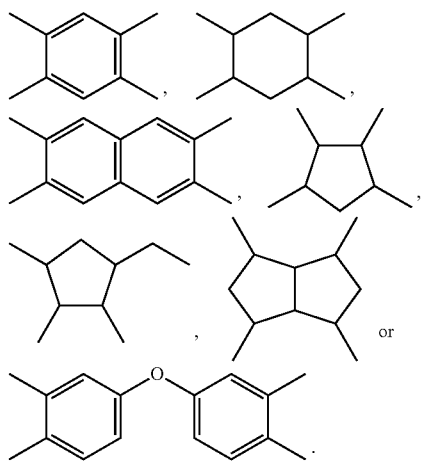

For example, in Chemical Formula 2, $R_2$ may represent a trivalent alkyl group having a carbon number of 1 to 20,

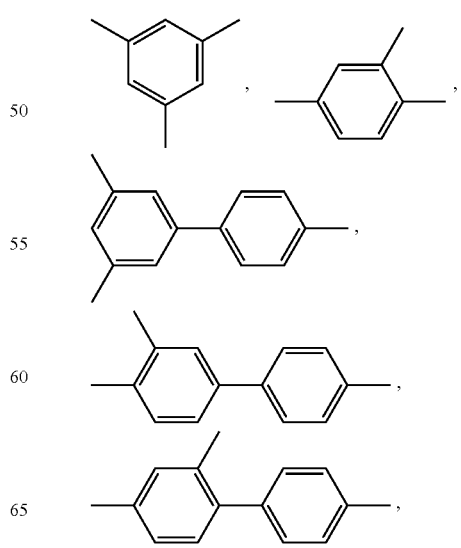

-continued

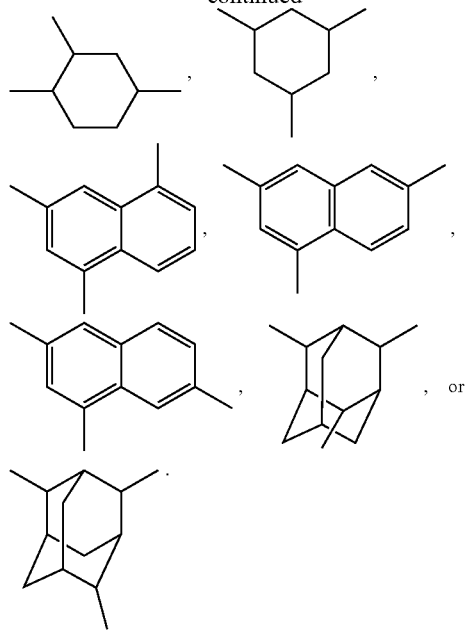

The alignment polymer may further include a photo-reactive side chain including a photo-reactive group as an end group. For example, the alignment polymer may further include a repeating unit represented by the following Chemical Formula 3.

<Chemical Formula 3>

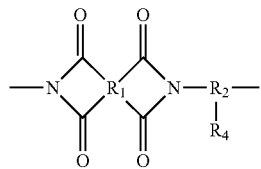

In Chemical Formula 3, $R_1$ represents a tetravalent organic group including an aromatic ring group or an aliphatic ring group, which has substituted or non-substituted hydrogen atoms. $R_2$ represents a trivalent organic group including an alkylene group having a carbon number of 1 to 20 or an aromatic ring group or an aliphatic ring group, which has substituted or non-substituted hydrogen atoms. $R_4$ represents -A4-B3-A5-B4-A6-D1. A4, A5 and A6 independently represent a single bond,

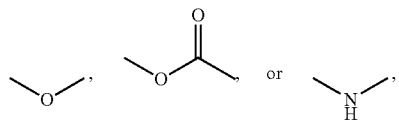

B3 and B4 independently represent a single bond, an alkylene group having a carbon number of 1 to 20,

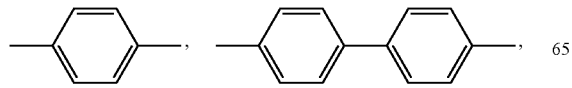

-continued

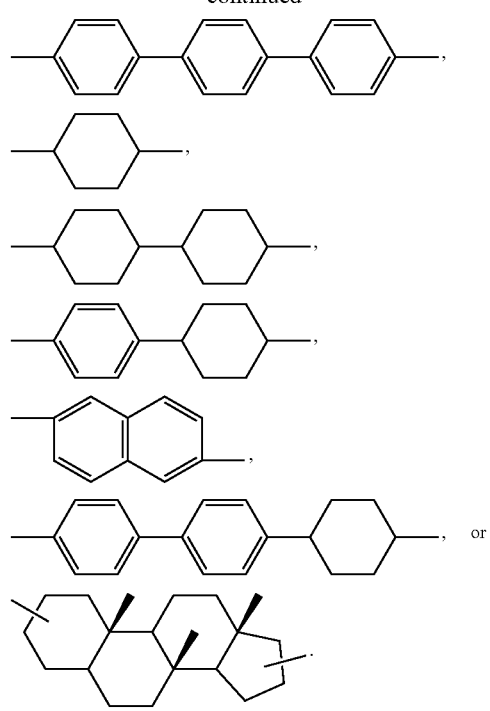

When B3 or B4 represents an alkylene group, at least one —$CH_2$— of the alkylene group may be substituted with —CH=CH— or —C≡C—. D1 represents

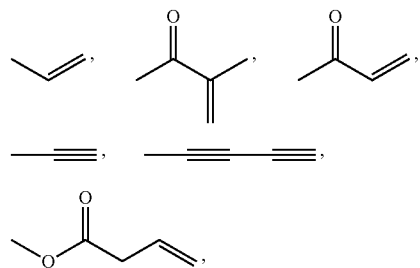

an epoxy group,

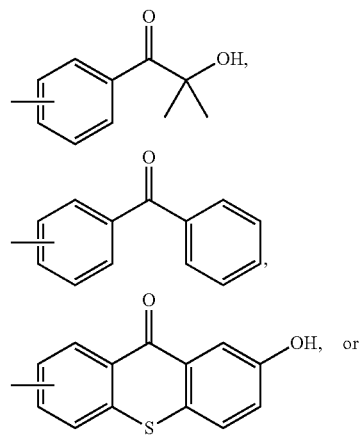

-continued

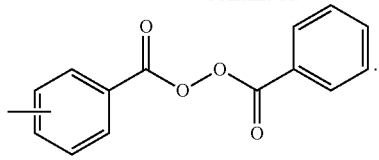

For example, the alignment polymer may be obtained by condensation reaction of dianhydride monomers and diamine monomers.

For example, the dianhydride monomer may be represented by the following Chemical Formula 2-1.

<Chemical Formula 2-1>

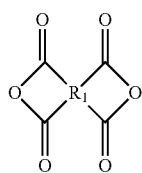

In Chemical Formula 2-1, $R_1$ may be same as $R_1$ defined in Chemical Formula 2.

The diamine monomer may include a first diamine monomer providing a vertical alignment side chain. The first diamine monomer may be represented by the following Chemical Formula 2-2.

<Chemical Formula 2-2>

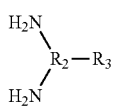

In Chemical Formula 2-2, $R_2$ and $R_3$ may be same as $R_2$ and $R_3$ defined in Chemical Formula 2.

The diamine monomer may further include a second diamine monomer providing a photo-reactive side chain. The second diamine monomer may be represented by the following Chemical Formula 2-3.

<Chemical Formula 2-3>

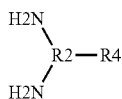

In Chemical Formula 2-2, $R_2$ and $R_4$ may be same as $R_2$ and $R_4$ defined in Chemical Formula 3.

When the alignment polymer includes both the repeating unit represented by the Chemical Formula 2 and the repeating unit represented by the Chemical Formula 3, a mole ratio of the repeating unit represented by the Chemical Formula 2 and the repeating unit represented by the Chemical Formula 3 may be 7:3 to 3:7.

In an exemplary embodiment, the alignment polymer may further include a side chain that improves the voltage-holding-ratio (VHR) of the alignment compositions and display panels utilizing the alignment compositions. For example, the alignment polymer may further include a repeating unit represented by the following Chemical Formula 4.

<Chemical Formula 4>

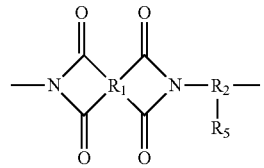

In Chemical Formula 4, $R_1$ and $R_2$ are same as those defined in Chemical Formula 2. $R_5$ represents -A7-B5-A8-E1. A7 and A8 independently represent a single bond,

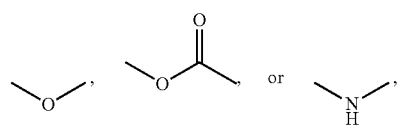

B5 represents a single bond, an alkylene group having a carbon number of 1 to 20,

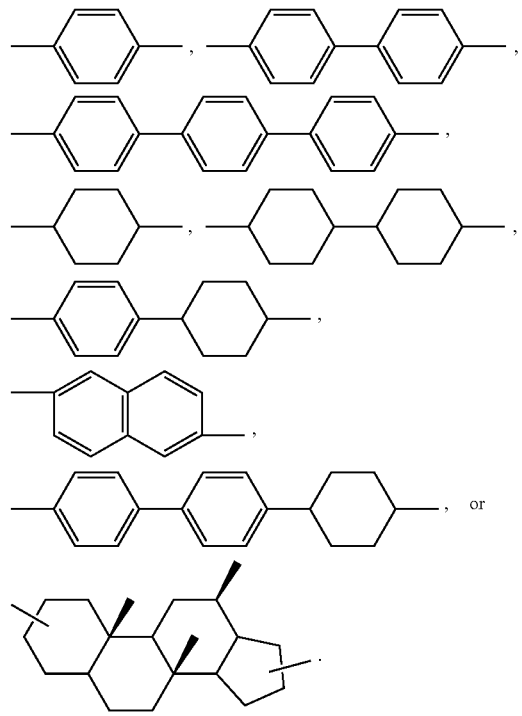

When B5 represents an alkylene group, at least one $-CH_2-$ of the alkylene group may be substituted with $-CH=CH-$ or $-C\equiv C-$. E1 represents $-COOH$ or an aromatic hetero ring including nitrogen.

For example, the alignment polymer may include any combination of repeating units. Examples of alignment polymers may include at least one repeating units represented by the following Chemical Formulas 2-4, 2-5, 2-6, 2-7, 2-8, 2-9, 2-10 and 2-11.

<Chemical Formula 2-4>
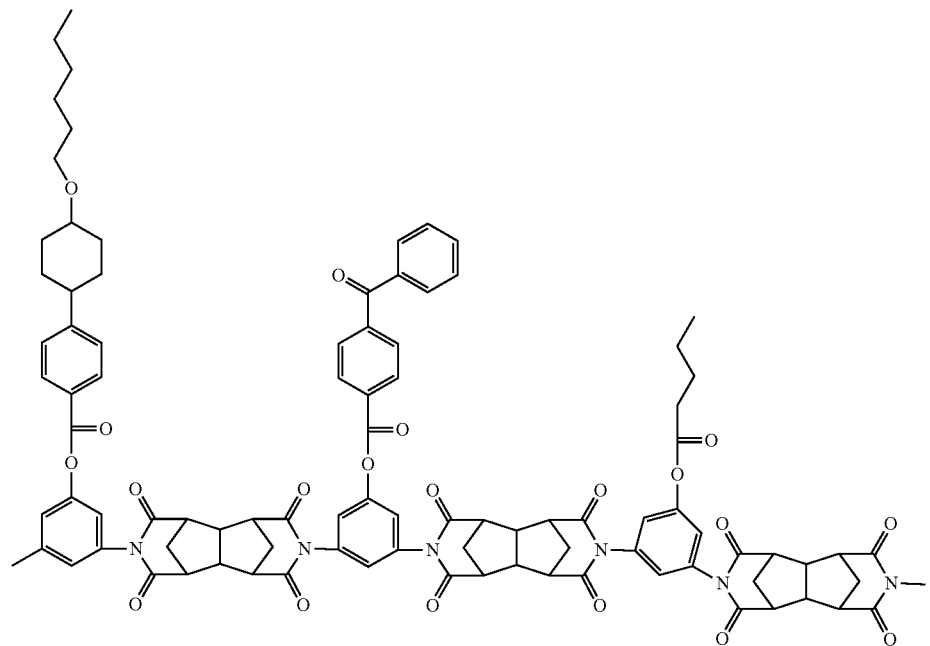
<Chemical Formula 2-5>
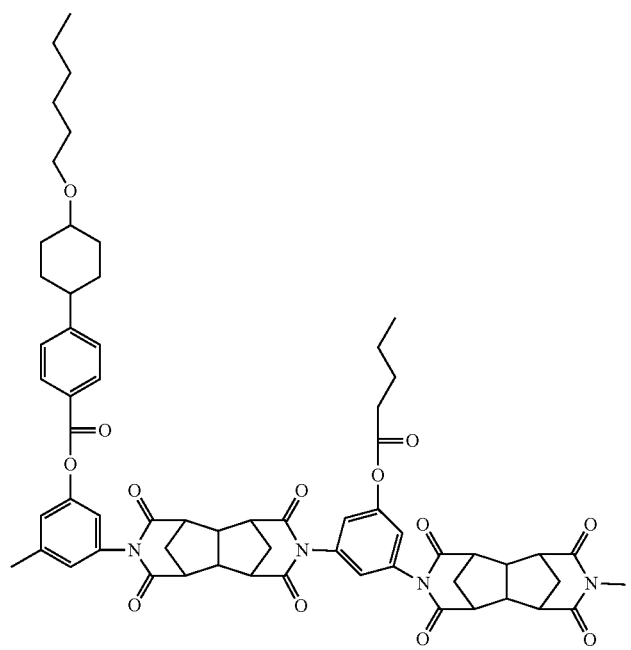

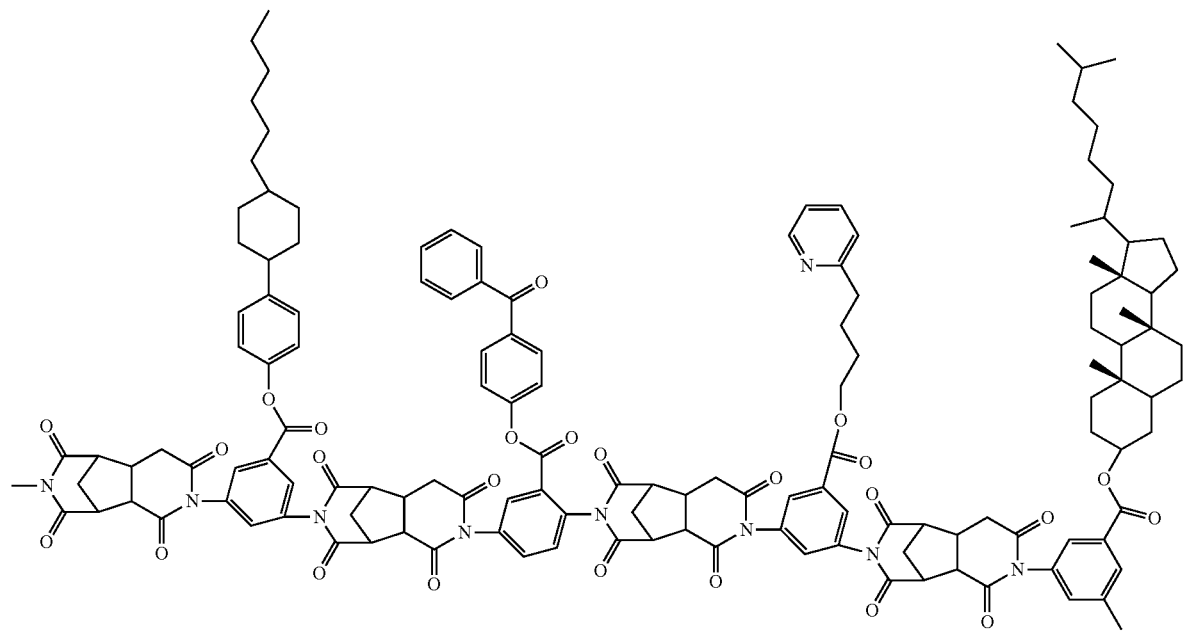
<Chemical Formula 2-6>
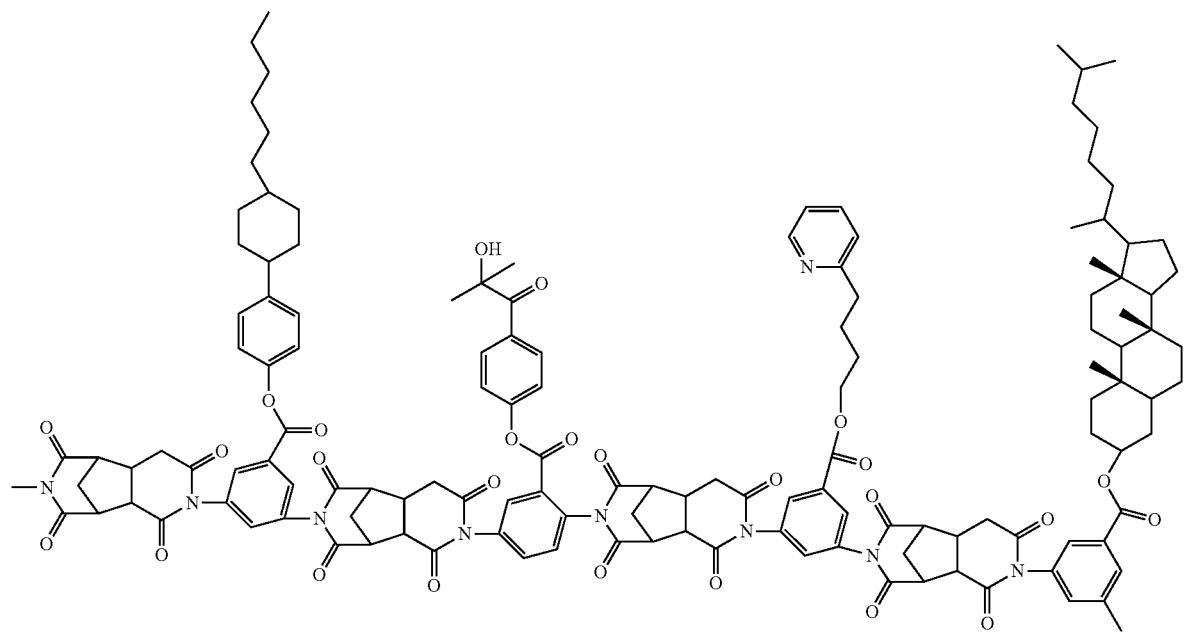
<Chemical Formula 2-7>

<Chemical Formula 2-8>
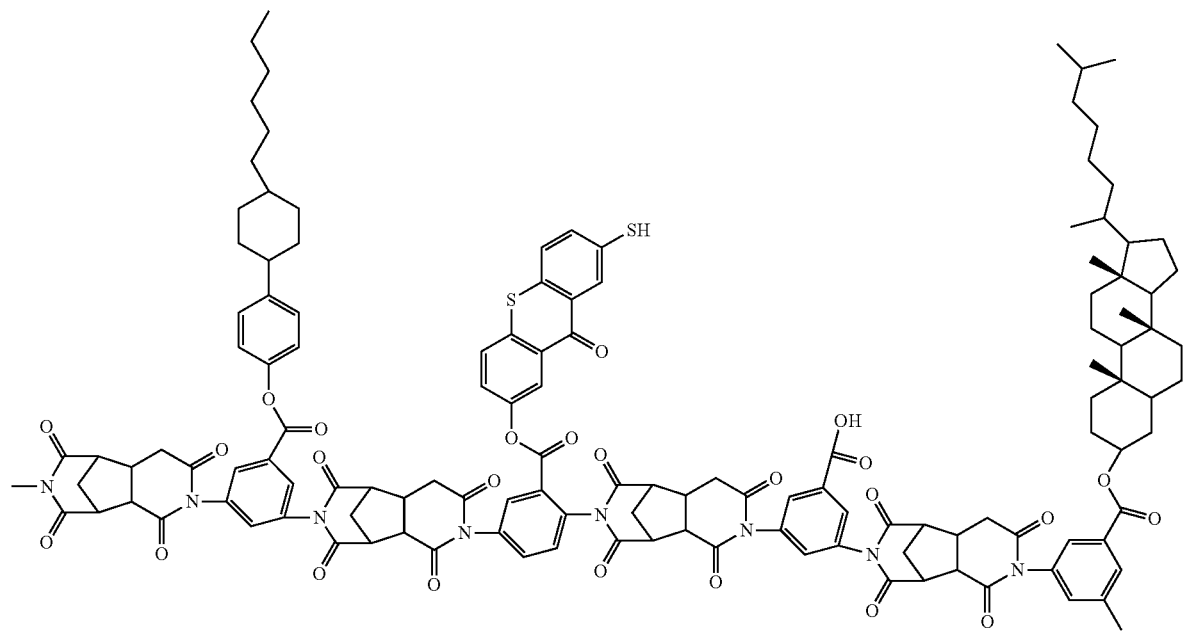
<Chemical Formula 2-9>
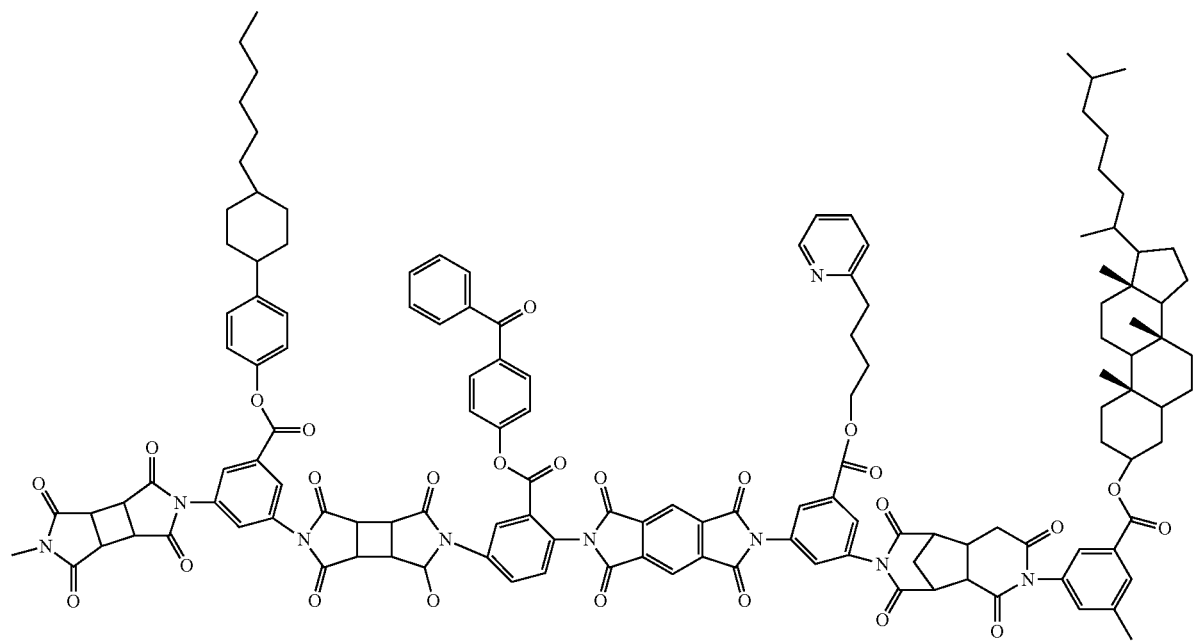

<Chemical Formula 2-10>

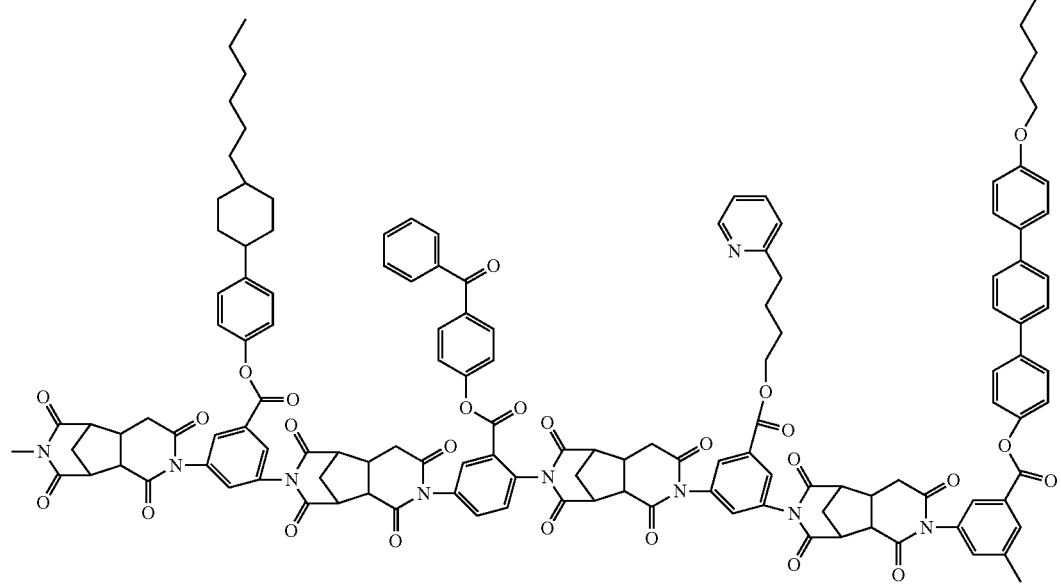

<Chemical Formula 2-11>

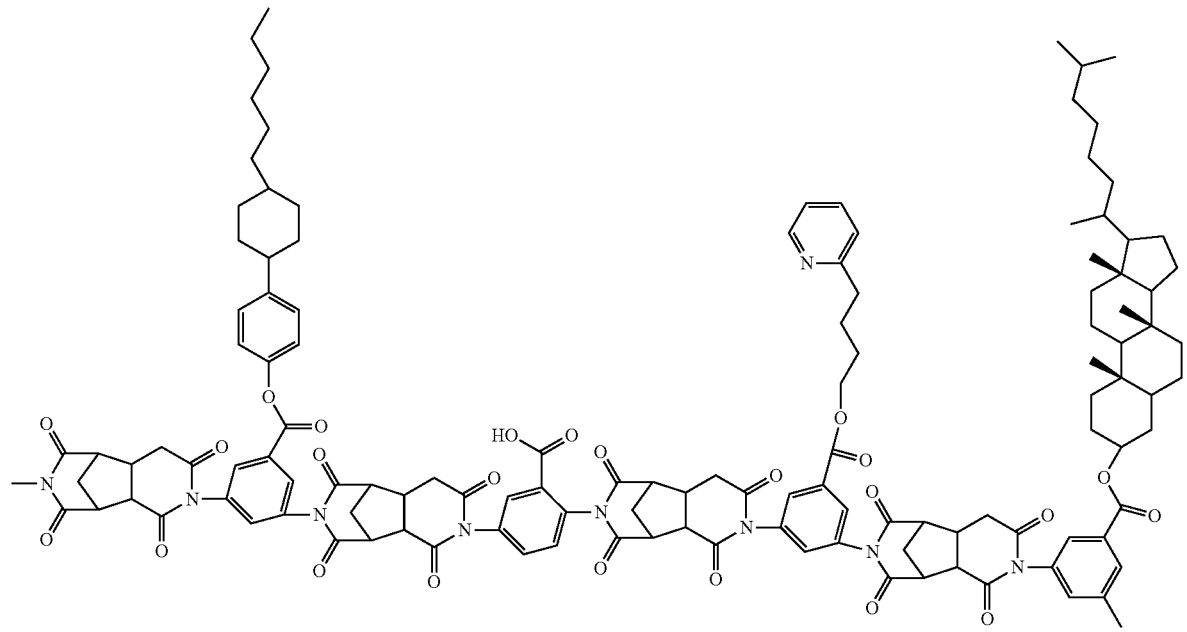

In an exemplary embodiment, the alignment polymer may include a first alignment polymer including a first repeating unit represented by Chemical Formula 2 and a second repeating unit represented by Chemical Formula 3, and a second alignment polymer including the first repeating unit represented by Chemical Formula 2.

For example, the alignment polymer may include the first repeating unit and the second repeating unit in a mole ratio of 7:3 to 3:7.

When the content of the second repeating unit is less than about 30 mole % based on total repeating units, reaction of the reactive mesogen may be reduced. Thus, it is difficult to pre-tilt liquid crystal molecules. When the content of the second repeating unit is more than about 70 mole % based on total repeating units, excess functional groups capable of photo-reacting are present and the degree of cross-linking of the reactive mesogen may be reduced.

For example, the alignment polymer may include the first alignment polymer and the second alignment polymer in a mole ratio of 6:4 to 8:2. For example, when the content of the first alignment polymer is less than about 60 mole % based on total alignment polymers, reaction of the reactive mesogen may be reduced. Thus, it is difficult to pre-tilt liquid crystal molecules. When the content of the first alignment polymer is more than about 80 mole % based on total alignment polymers, electrical polarization is increased thereby deteriorating electrical characteristics of an alignment layer formed from the alignment composition.

In an exemplary embodiment, the content of the reactive mesogen may be about 1 to 20% by weight based on a total weight of the alignment polymer. For example, the weight-average molecular weight of the alignment polymer may be about 1,000 to about 10,000,000.

The alignment composition may further include a solvent. Solvents known for conventional alignment compositions may be used for the alignment composition according to an exemplary embodiment. For example, the solvent may include N-methylpyrrolidone, N-ethylpyrrolidone, γ-butyrolactone, methylcellosolve, ethylcellosolve, butylcellosolve, ethyleneglycol ether, ethyleneglycol acetate, propyleneglycol ether, propyleneglycol acetate, 1,3-dimethyl-2-imidazolidinone, 3-methoxy-N,N-dimethylpropanamide or the like. These can be used each alone or in combination thereof. The alignment composition may include about 5% to about 90% by weight of the solvent.

The alignment composition may further include an additive such as a surfactant as desired.

According to an exemplary embodiment, an alignment composition comprising a reactive mesogen that is separated from an alignment polymer is used. Thus, reactive groups of the reactive mesogen may be increased. Thus, the degree of cross-linking of the reactive mesogen may be increased thereby improving a display quality of a display panel.

Furthermore, a photo-reactive group may be introduced into the alignment polymer. The photo-reactive group may react with the reactive mesogen or may promote reaction of the reactive mesogen to increase the degree of cross-linking of the reactive mesogen.

An alignment composition according to another exemplary embodiment includes an alignment polymer and a reactive mesogen. The alignment polymer includes a polyimide backbone and a vertical alignment side chain combined with the polyimide backbone. The reactive mesogen may be represented by the following Chemical Formula 6.

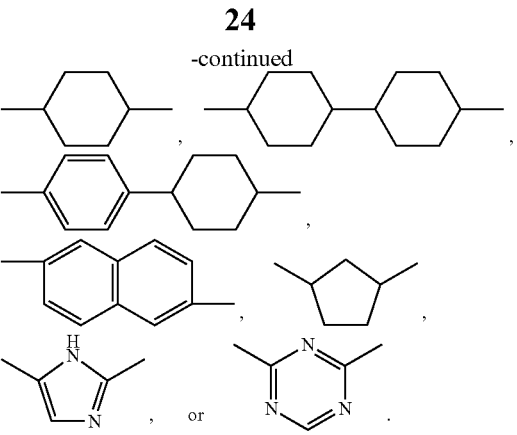

At least one hydrogen atom on a carbon ring or a hetero ring of Ar may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group. $X_1$, $X_2$, $X_3$, $X_4$, $X_5$ and $X_6$ independently represent a single bond,

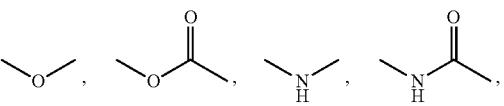

—$CH_2$—, —C=C= or —C≡C—. $Y_1$ and $Y_2$ independently represent a single bond or an alkylene group having carbon atoms of 1 to 12. $P_1$ and $P_2$ independently represent an alkenyl group having a carbon number of 2 to 20 and including an unsaturated carbon bond as an end group, an alkynyl group having a carbon number of 2 to 20 and including an unsaturated carbon bond as an end group, an <Chemical Formula 6>

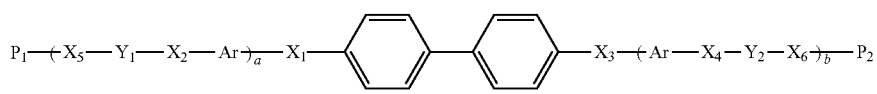

In Chemical Formula 6, at least one hydrogen atom in

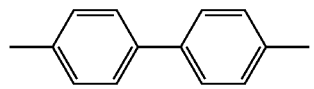

may be substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group. "a" and "b" independently represent 0, 1 or 2. Ar represents

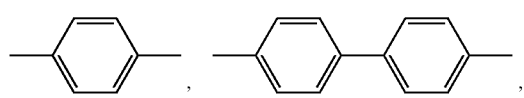

alkenylcarbonyl group having a carbon number of 3 to 20 and including an unsaturated carbon bond as an end group, an alkenylcarbonyloxy group having a carbon number of 3 to 20 and including an unsaturated carbon bond as an end group, a an oxotetrahydrofuryl group having —(C=$CH_2$)— substituted for at least one —$CH_2$—, or an epoxy group.

For example, $P_1$ and $P_2$ may independently represent

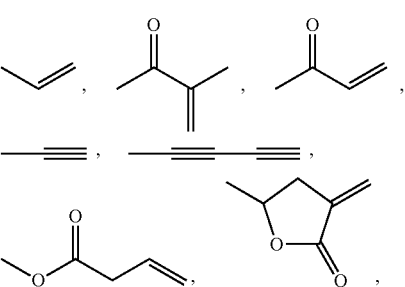

or an epoxy group.

For example, the reactive mesogen may include at least one of compounds represented by the following Chemical Formulas 6-1, 6-2, 6-3 and 6-4.

various shapes such as a rectangular shape extending in a direction, a V shape, a Z shape or the like.

The liquid crystal display panel includes a display area DA displaying an image and a peripheral area PA surround- <Chemical Formula 6-1>

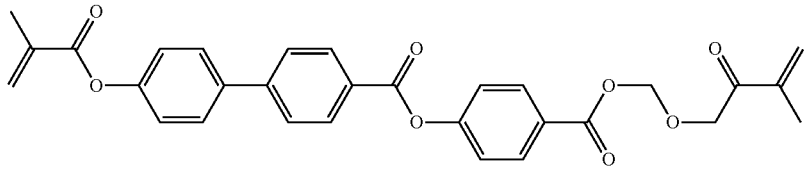

<Chemical Formula 6-2>

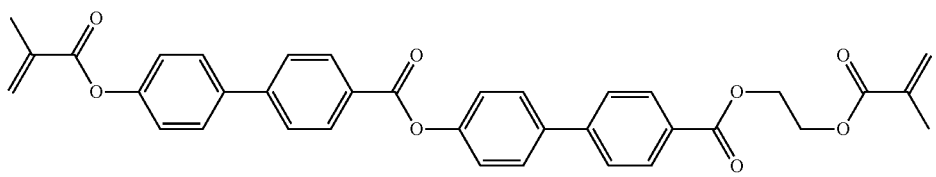

<Chemical Formula 6-3>

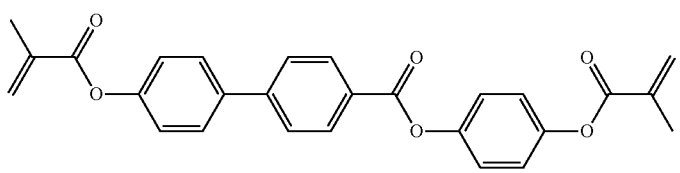

<Chemical Formula 6-4>

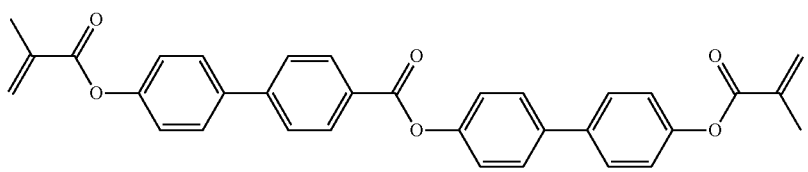

The alignment polymer may be substantially the same as previously explained. Thus, any duplicated explanation will be omitted.

In another exemplary embodiment, the alignment polymer may include a polysiloxane-based polymer. The polysiloxane-based polymer may be obtained from condensation of alkoxyl silane. The alkoxyl silane may include a group corresponding to the vertical alignment side chain or the photo-reactive side chain.

Figure 2:
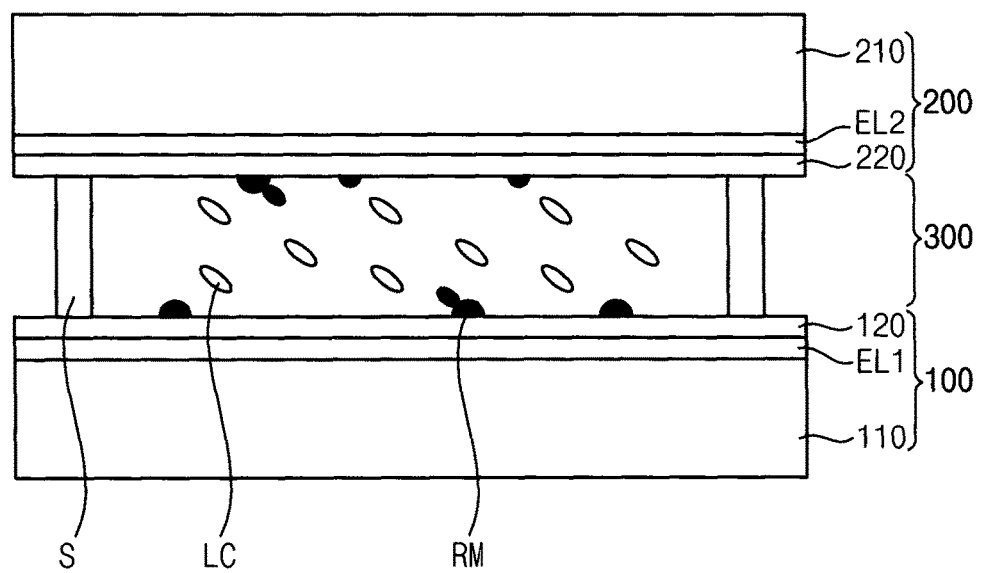
FIG. 2 is a cross-sectional view illustrating an example embodiment of a display panel.

Liquid Crystal Display Panel and Method for Manufacturing the Liquid Crystal Display Panel FIG. 1 is a plan view illustrating a liquid crystal display panel according to an exemplary embodiment. FIG. 2 is a cross-sectional view illustrating a liquid crystal display panel according to an exemplary embodiment.

Referring to FIG. 1, a liquid crystal display panel includes a plurality of gate lines GL, a plurality of data lines DL and thin film transistor array including a plurality of thin film transistors.

For example, the gate line GL may extend in a first direction D1. The data line DL may extend in a second direction D2 crossing the first direction D1. In another exemplary embodiment, the gate line GL may extend in the second direction D2, and the data line may extend in the first direction D1.

The gate line GL and the data line DL may be electrically connected to the thin film transistors and to a first electrode (pixel electrode). An area overlapping the first electrode may be defined as a pixel area, such as pixel area PX.

For example, a plurality of pixel areas may be arranged in a matrix configuration. Each of the pixel areas may have ing the display area DA. A sealing member S may be disposed between the display area DA and the peripheral area PA.

Referring to FIGS. 1 and 2, the liquid crystal display panel may include an array substrate 100, an opposing substrate 200, a liquid crystal layer 300 and a sealing member S.

The array substrate 100 includes a first substrate 110, a first electrode EL1 and a first alignment layer 120.

The first substrate 110 may include a transparent insulation substrate. For example, the first substrate 110 may include a glass substrate or a plastic substrate. The first substrate 110 may include a plurality of pixel areas displaying an image. The pixel areas may be arranged in a matrix configuration including a plurality of rows and a plurality of columns.

The first electrode EL1 may be disposed on the first substrate 110. The first electrode EL1 may include a transparent conductive material such as indium tin oxide (ITO), indium zinc oxide (IZO), aluminum-doped zinc oxide (AZO) or the like.

While the first electrode EL1 is illustrated in FIGS. 2 and 3A-3H to cover an entire portion of the first substrate 110, this representation is simplified for ease of explanation. In an exemplary embodiment, a plurality of first electrodes are spaced apart from each other, and each of the first electrodes corresponds to each of the pixel areas. In an exemplary embodiment, the first electrode EL1 may include a slit pattern.

The first alignment layer 120 is disposed on the first electrode EL1, and includes an alignment polymer and a reactive mesogen RM.

The opposing substrate 200 includes a second substrate 210, a second electrode EL2 and a second alignment layer 220.

The second substrate 210 may include a transparent insulation substrate. For example, the second substrate 210 may include a glass substrate or a plastic substrate.

The second electrode EL2 may be disposed on the second substrate 210. The second electrode EL2 may include a transparent conductive material such as indium tin oxide (ITO), indium zinc oxide (IZO), aluminum-doped zinc oxide (AZO) or the like.

In an exemplary embodiment, the second electrode EL2 may be a common electrode. For example, the second electrode EL2 may have a continuous plate shape that is not patterned. Alternatively, the second electrode EL2 may have a slit. Furthermore, the second electrode EL2 may be formed on a same substrate as the first electrode EL1.

The second alignment layer 220 is disposed on the second electrode EL2, and includes an alignment polymer and a reactive mesogen RM.

The first alignment layer 120 and the second alignment layer 220 are disposed respectively on a surface of the first substrate 110 and a surface of the second substrate 210 to contact the liquid crystal layer 300.

The liquid crystal layer 300 may be disposed between the array substrate 100 and the opposing substrate 200.

The liquid crystal layer 300 includes liquid crystal molecules. Voltage applied between the first electrode EL1 and the second electrode EL2 produces an electric field across the liquid crystal layer 300 that controls alignment of the liquid crystal molecules to change light transmittance for each of the pixel areas.

For example, the liquid crystal molecules may be vertically aligned with respect to the first substrate 110 and the second substrate 210 when the electric field is applied thereto.

The sealing member S surrounds a side surface of the liquid crystal layer 300.

In an exemplary embodiment, the alignment polymer includes a polyimide backbone and a vertical alignment side chain combined with the polyimide backbone. For example, the alignment polymer includes a repeating unit represented by the following Chemical Formula 2. In Chemical Formula 2, $R_3$ may be a vertical alignment side chain.

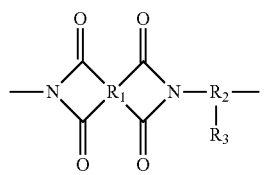

<Chemical Formula 2>

For example, the alignment polymer may further include a photo-reactive side chain including a photo-reactive group as an end group. For example, the alignment polymer may further include a repeating unit represented by the following Chemical Formula 3.

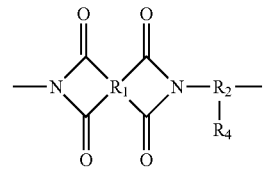

<Chemical Formula 3>

For example, the alignment polymer may further include a side chain that improves the voltage-holding-ratio (VHR) of the alignment composition and panels utilizing the alignment composition. For example, the alignment polymer may further include a repeating unit represented by the following Chemical Formula 4.

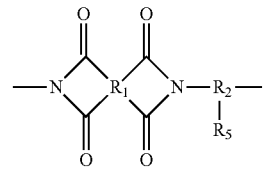

<Chemical Formula 4>

In Chemical Formulas 2, 3 and 4, $R_1$, $R_2$, $R_3$, $R_4$ and $R_5$ are substantially same as those previously explained. Thus, any duplicated explanation may be omitted.

In an exemplary embodiment, the reactive mesogen may include a compound represented by the following Chemical Formula 1.

M5-M1-M2-M3-M4    <Chemical Formula 1>

Since the reactive mesogen RM includes a reactive group as an end group, the reactive mesogen RM may react with each other to form a repeating unit represented by the following Chemical Formula 5.

-M6-M1-M2-M3-M7-    <Chemical Formula 5>

In Chemical Formulas 1 and 5, M1, M2 and M3 are substantially the same as those previously explained. M6 represents -M2-M3- or -M3-. M7 represents an alkylene group having carbon atoms of 1 to 40, and at least one —CH$_2$— of M7 may be substituted with —CH=CH—,

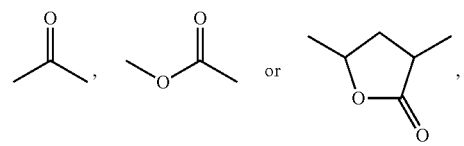

and at least one hydrogen atom of each —CH$_2$— of M7 may be substituted with —CH$_3$.

In another exemplary embodiment, the reactive mesogen may include a compound that is represented by the following Chemical Formula 6.

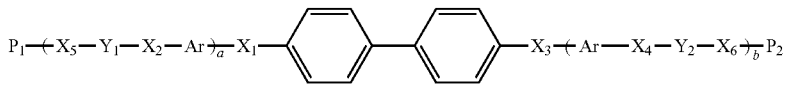

<Chemical Formula 6>

Since the reactive mesogen RM includes a reactive group as an end group, the reactive mesogen RM may react with each other to form a repeating unit represented by the following Chemical Formula 7.

<Chemical Formula 7>

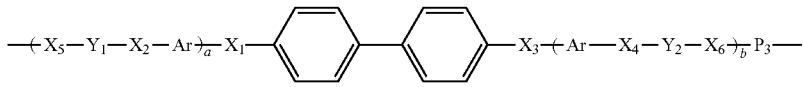

In Chemical Formulas 6 and 7, $X_1$, $X_2$, $X_3$, $X_4$, $X_5$, $X_6$, $Y_1$, $Y_2$, Ar, $P_1$ and $P_2$ are substantially same as those previously explained. $P_3$ represents an alkylene group having carbon atoms of 1 to 40, and at least one —$CH_2$— of $P_3$ may be substituted with —CH=CH—,

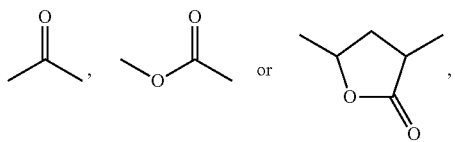

and at least one hydrogen atom of each —$CH_2$— of $P_3$ may be substituted with —$CH_3$.

In an exemplary embodiment, the alignment polymer may include a first alignment polymer including a first repeating unit represented by Chemical Formula 2 and a second repeating unit represented by Chemical Formula 3, and a second alignment polymer including the first repeating unit represented by Chemical Formula 2.

The first alignment polymer and the second alignment polymer may be non-uniformly dispersed in an alignment layer or may form separated layers, because of a hydrophilic difference between the first alignment polymer and the second alignment polymer. For example, the first alignment polymer may be disposed closer to the liquid crystal layer 300 than the second alignment polymer. The photo-reactive side chain of the first alignment polymer may increase or promote reaction of the reactive mesogen RM.

The photo-reactive side chain includes a photo-reactive group as an end group thereof. The photo-reactive group includes

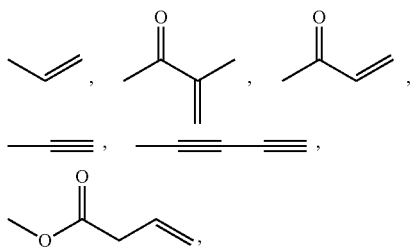

an epoxy group,

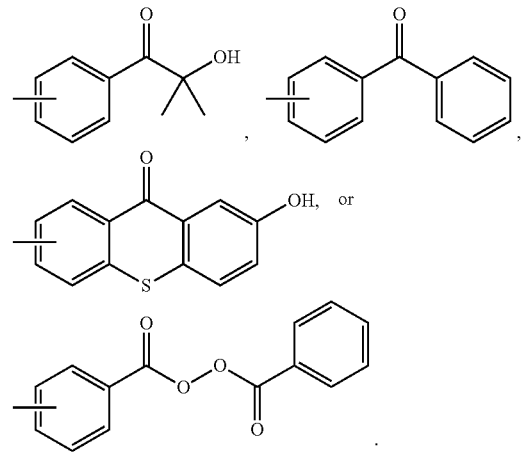

When the photo-reactive group includes

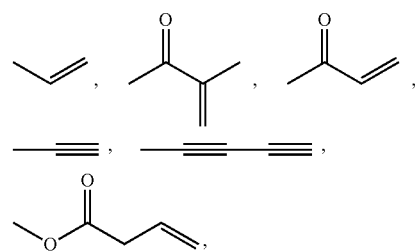

or an epoxy group, the photo-reactive group may react with an adjacent photo-reactive group or with the reactive mesogen RM to form a bond.

When the photo-reactive group includes

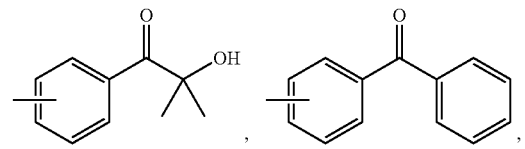

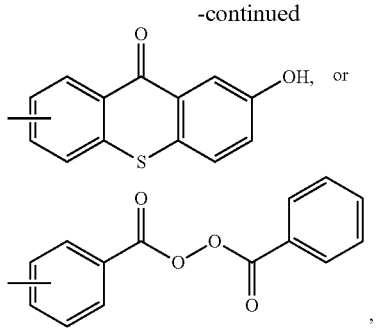

the photo-reactive group may generate a radical that increases or promotes reaction of the reactive mesogen RM.

The reactive mesogen RM may react with each other or with the photo-reactive group of the alignment polymer. The reactive mesogen RM may provide a pre-tilt angle to the liquid crystal molecules of the liquid crystal layer 300.

FIGS. 3A to 3H are cross-sectional views illustrating an example embodiment of a method of manufacturing a display panel.

Figure 3A:
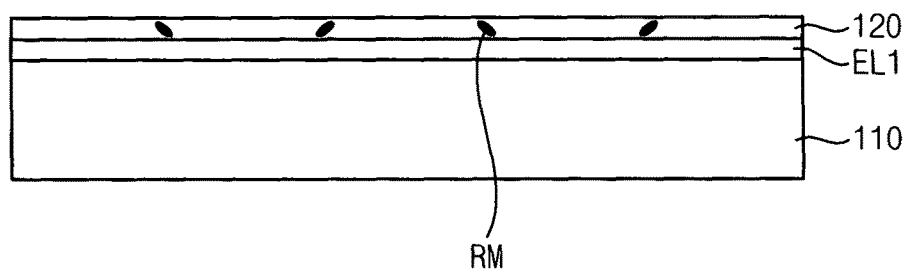
FIGS. 3A to 3H are cross-sectional views illustrating an example embodiment of a method of manufacturing a display panel.
Figure 3B:
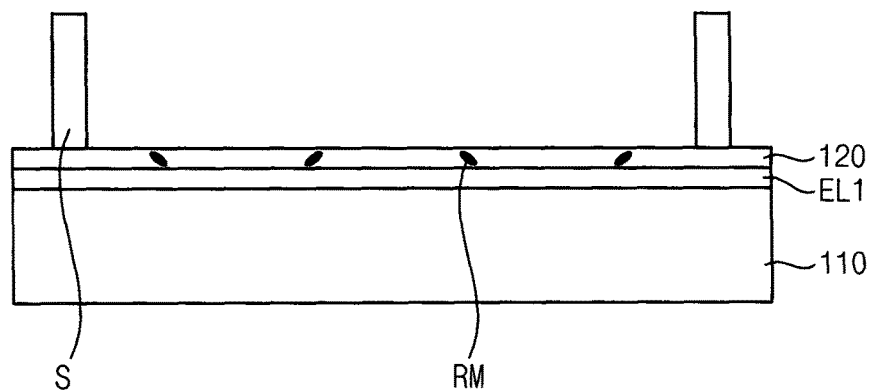

Referring to FIGS. 2 and 3A, a first electrode EL1 is formed on a first substrate 110. The first electrode EL1 may be a pixel electrode electrically connected to a thin film transistor.

An alignment composition may be coated on the first substrate 110 thus forming a first alignment layer 120. The alignment composition may include an alignment polymer and a reactive mesogen RM. The alignment polymer and the reactive mesogen RM may be same as any of the embodiments described herein. Thus, any duplicated explanation for the alignment polymer and the reactive mesogen RM may be omitted.

The coated alignment composition may be heated to remove a solvent and to increase a ratio of imidization of the alignment polymer. For example, a pre-baking step for removing the solvent and a main-baking step for increasing the ratio of imidization of the alignment polymer may be performed.

Referring to FIGS. 1 to 3B, a sealing member S may be disposed on the first substrate 110. An area surrounded by the sealing member S may be defined as a display area DA, and an area surrounding the display area DA may be defined as a peripheral area PA.

Figure 3C:
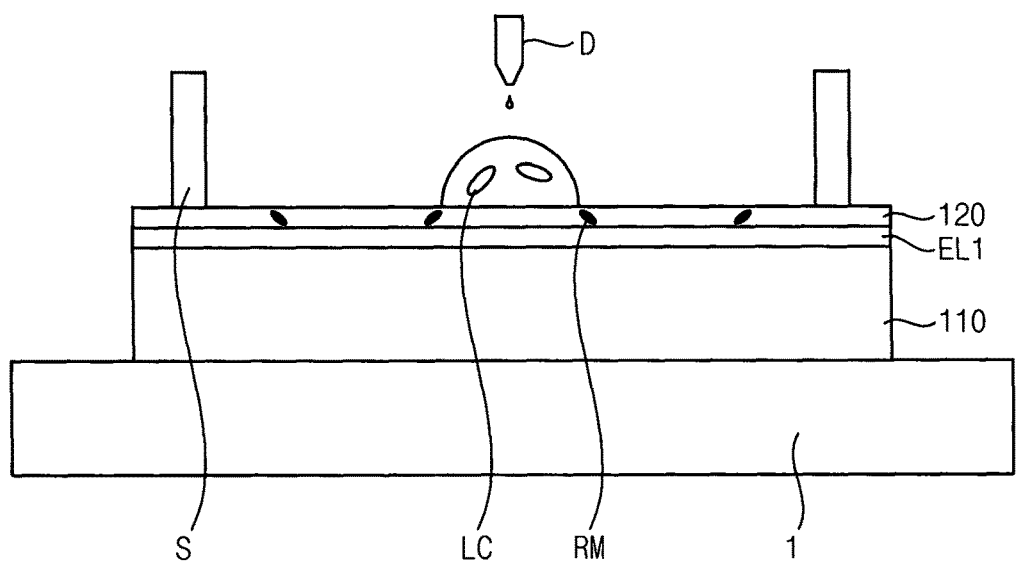
Figure 3D:
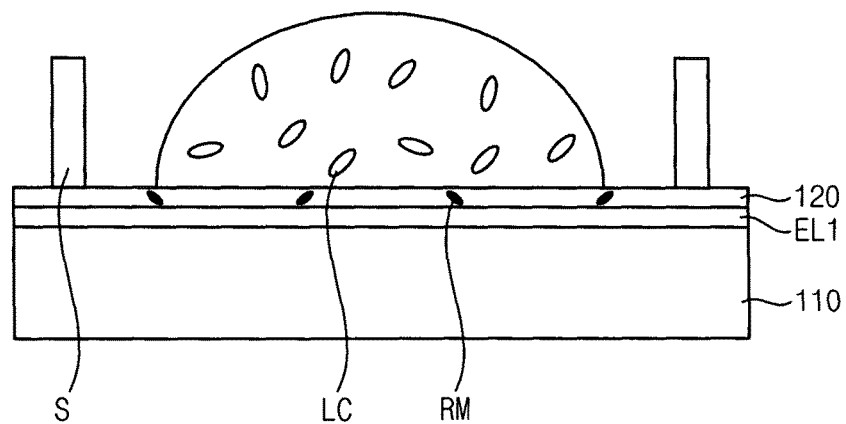

Referring to FIGS. 3C and 3D, a liquid crystal LC may be applied to (e.g., dropped on) the first alignment layer 120 using a liquid crystal dispenser D. For example, the liquid crystal LC may be dropped using a ODF (one drop filling) process. Thus, process time and/or production ability may be improved.

For example, the liquid crystal LC may be applied to (e.g., by dropping using a dispenser) the first alignment layer 120. Either the liquid crystal dispenser D or a stage 1, which is placed under the first substrate 110, (or both) may be moved, so that a desired amount of the liquid crystal LC may be applied to (e.g., dropped on) the first alignment layer 120.

For example, the liquid crystal LC may further include a reactive mesogen. An amount of the reactive mesogen may be about 0.01 wt % to about 0.5 wt % based on a total weight of the liquid crystal LC. The reactive mesogen may be substantially same as the reactive mesogen RM in the first alignment layer 120.

Figure 3E:
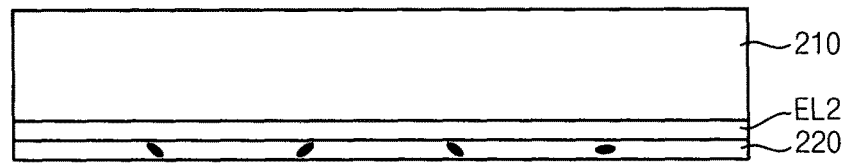
Figure 3E:
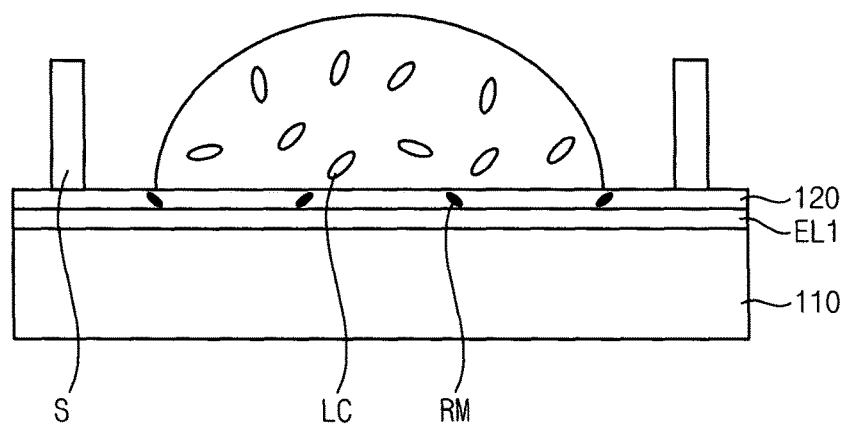

Referring to FIG. 3E, a second substrate 210 is combined with the first substrate 110 so that a liquid crystal layer 300 is disposed between the first substrate 110 and the second substrate 210.

The second substrate 210 may further include a second electrode EL2 and a second alignment layer 220. The second alignment layer 220 may include a same material as the first alignment layer 120. The second electrode 220 may be a common electrode for a liquid crystal display panel.

In another exemplary embodiment, the second electrode EL2 may not be disposed on the second substrate 210, but disposed on the first substrate 110. Furthermore, the second alignment layer 220 may be omitted.

Figure 3F:
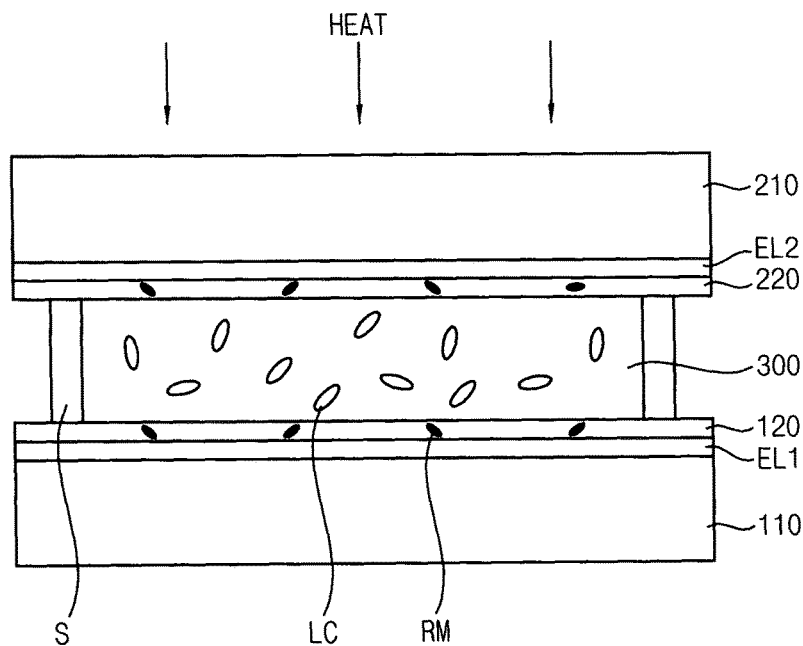

Referring to FIG. 3F, the first substrate 110 and the second substrate 210 combined with each other may be heated. The heating process may be performed for curing the sealing member S.

When the first alignment layer 120 and the second alignment layer 220 are heated while contacting the liquid crystal layer 300, the reactive mesogen RM in the first alignment layer 120 and the second alignment layer 220 may be released into the liquid crystal layer 300.

Figure 3G:
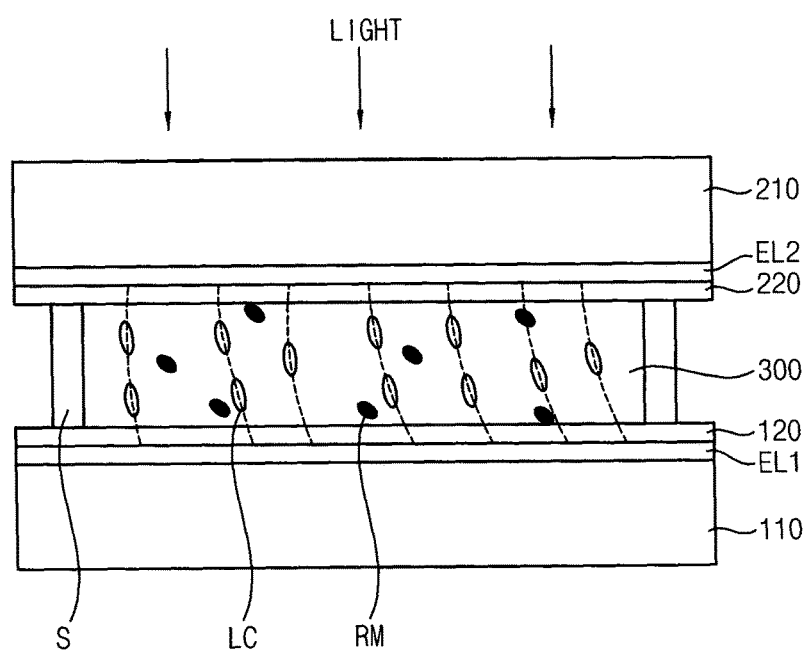
Figure 3H:
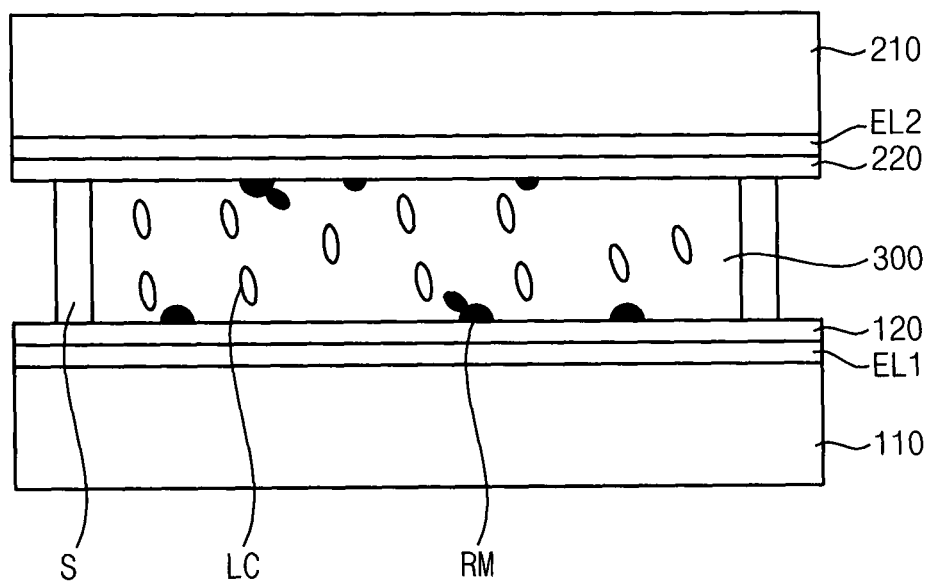

Referring to FIGS. 3G and 3H, the first substrate 110 and the second substrate 210 are irradiated with light so that the first alignment layer 120 and the second alignment layer 220 are exposed to the light.

The light that is used to irradiate the first substrate 110 and the second substrate 210 may be ultraviolet. For example, the energy per unit area of the light used to irradiate may be equal to or more than 10 J/cm$^2$.

A voltage may be applied to the first electrode EL1 and the second electrode EL2 prior to exposing the first substrate 110 and the second substrate 210 to light. Therefore, an electric field may be formed in the liquid crystal layer 300. For example, the voltage may be about 10V to about 30V.

When the voltage is applied, the liquid crystal LC in the liquid crystal layer 300 may be aligned by the electric field. When the first alignment layer 120 and the second alignment layer 220 are exposed to light while the liquid crystal LC is aligned by the electric field, the reactive mesogen RM in the alignment layers 120 and 220 react with each other so that alignment of liquid crystal LC adjacent to the alignment layers 120 and 220 are locked in or secured. Thus, a pre-tilt angle may be provided to the liquid crystal layer 300. For example, a pre-tilt angle of the liquid crystal layer 300 may be about 85° to about 89°. The pre-tilt angle may be defined as an angle formed by a plane parallel to an upper surface of the substrates and a major axis of a liquid crystal molecule adjacent to and tilted by the alignment layers.

Although not illustrated in the figures, after a process of exposing the alignment layers 120 and 220 to light, the first substrate 110 and the second substrate 210 may be repeatedly exposed to light to remove any remaining reactive mesogen RM in the liquid crystal layer 300. However, an electric field may not be applied to the liquid crystal layer 300 during such repeated exposure.

Any of the exemplary embodiments described herein may be used for manufacturing a display panel or a display apparatus including an alignment layer.

The foregoing is illustrative of the inventive concept and is not to be construed as limiting thereof. Although a few example embodiments of the inventive concept have been described, those skilled in the art will readily appreciate that many modifications are possible in the example embodiments without materially departing from the novel teachings and advantages of the inventive concept. Accordingly, all such modifications are intended to be included within the scope of the inventive concept as disclosed herein, including in the claims. Therefore, it is to be understood that the foregoing is illustrative of the inventive concept and is not to be construed as limited to the specific example embodi-

What is claimed is:

1. An alignment composition comprising:
   an alignment polymer including a polyimide backbone and a vertical alignment side chain combined with the polyimide backbone; and
   a reactive mesogen represented by following Chemical Formulas 6-1, 6-2, 6-3 or 6-4, <Chemical Formula 6-1>

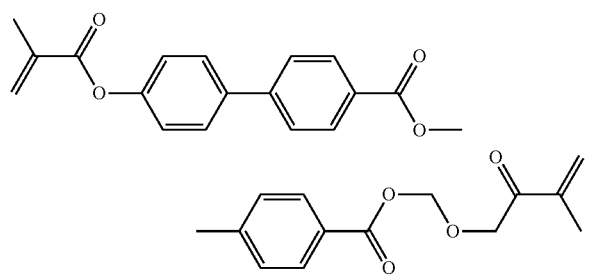

<Chemical Formula 6-2>

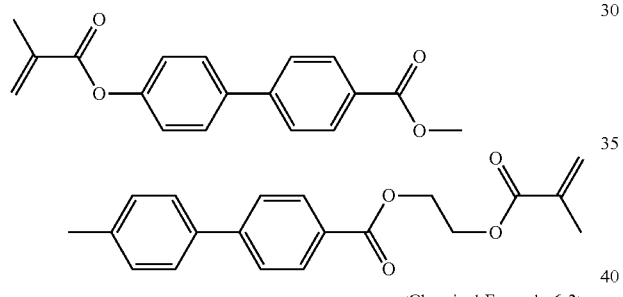

<Chemical Formula 6-3>

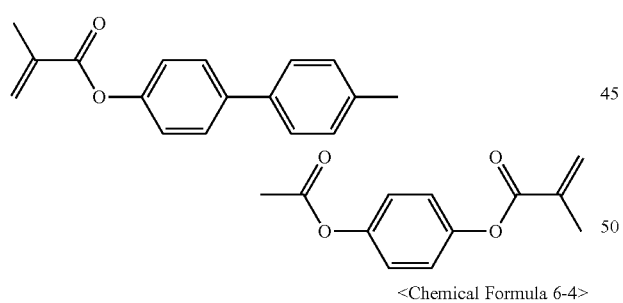

<Chemical Formula 6-4>

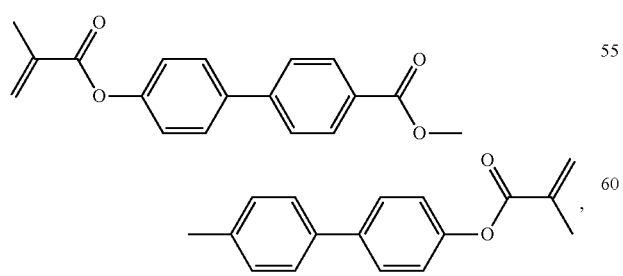

wherein the alignment polymer includes a repeating unit represented by Chemical Formula 2, <Chemical Formula 2>

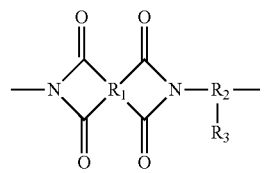

wherein, $R_1$ represents a tetravalent organic group including an aromatic ring group or an aliphatic ring group, and $R_2$ represents a trivalent organic group including an alkylene group having a carbon number of 1 to 20 or an aromatic ring group or an aliphatic ring group, and $R_3$ represents -A1-B1-A2-B2-A3-C1, wherein A1, A2 and A3 independently represent a single bond,

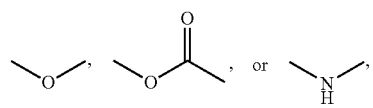

and B1 and B2 independently represent a single bond, an alkylene group having a carbon number of 1 to 20,

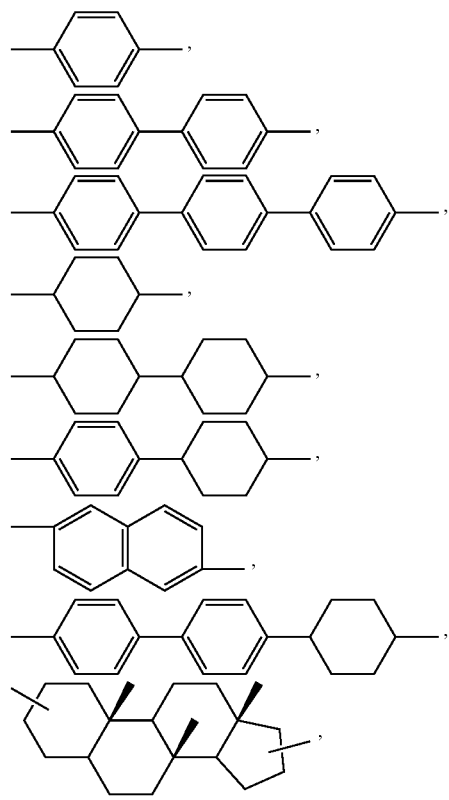

and when B1 or B2 represents an alkylene group having a carbon number of 2 to 20, at least one —CH2- of the alkylene group can be optionally substituted with —CH=CH— or —C≡C—, and when B1 or B2 includes a carbon ring, at least one hydrogen atom on the carbon ring of B1 and B2 can be optionally substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group, and C, 1 represents an alkyl group having a carbon number of 1 to 20 and having a ring shape, a chain shape or a chain shape including a side chain.

2. The alignment composition of claim 1, wherein the alignment polymer further includes a photo-reactive side chain including a photo-reactive group as an end group, the photo-reactive group representing

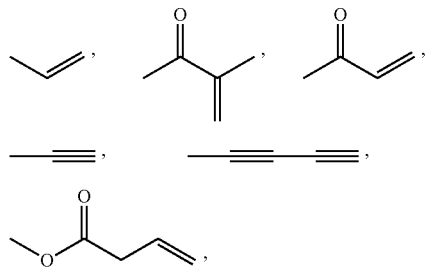

an epoxy group,

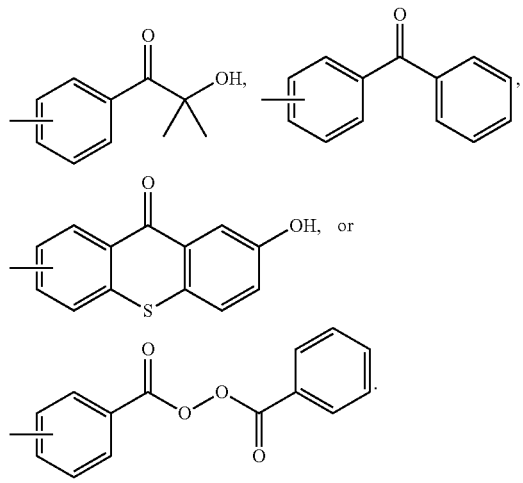

3. The alignment composition of claim 1, wherein the alignment polymer further includes a repeating unit represented by Chemical Formula 3, <Chemical Formula 3>

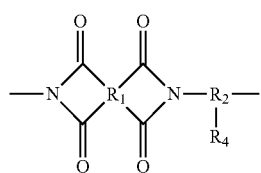

wherein $R_1$ represents a tetravalent organic group including an aromatic ring group or an aliphatic ring group, and $R_2$ represents a trivalent organic group including an alkylene group having a carbon number of 1 to 20 or an aromatic ring group or an aliphatic ring group, and R4 represents -A4-B3-A5-B4-A6-D1, wherein A4, A5 and A6 independently represent a single bond,

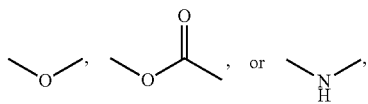

and B3 and B4 independently represent a single bond, an alkylene group having a carbon number of 1 to 20,

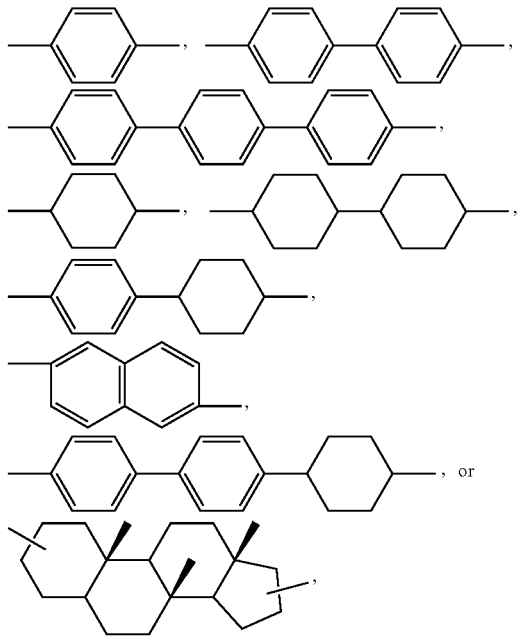

and when B3 or B4 represents an alkylene group, at least one —$CH_2$— of the alkylene group can be optionally substituted with —CH=CH— or —C≡C—, and D1 represents

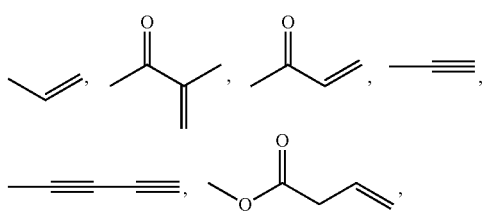

an epoxy group,

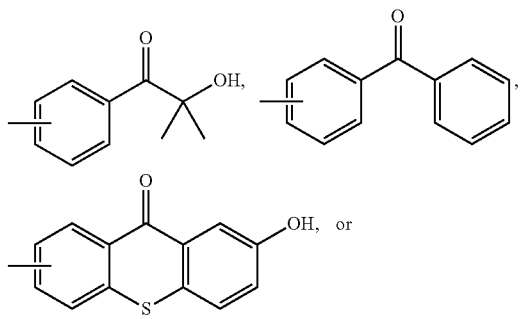

-continued

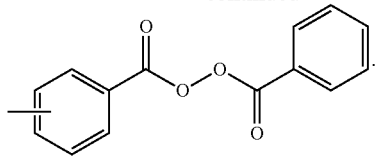

4. A liquid crystal display panel comprising:
a first substrate;
a second substrate facing the first substrate;
a liquid crystal layer disposed between the first and second substrates; and
an alignment layer disposed on at least one of a surface of the first substrate and a surface of the second substrate to contact the liquid crystal layer,
wherein the alignment layer comprises an alignment polymer including a polyimide backbone and a vertical alignment side chain combined with the polyimide backbone, and a reactive mesogen represented by following Chemical Formulas 6-1, 6-2, 6-3 or 6-4, wherein, $R_1$ represents a tetravalent organic group including an aromatic ring group or an aliphatic ring group, and $R_2$ represents a trivalent organic group including an alkylene group having a carbon number of 1 to 20 or an aromatic ring group or an aliphatic ring group, and $R_3$ represents -A1-B1-A2-B2-A3-C1, wherein A1, A2 and A3 independently represent a single bond,

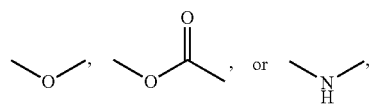

and B1 and B2 independently represent a single bond, an alkylene group having a carbon number of 1 to 20, <Chemical Formula 6-1>
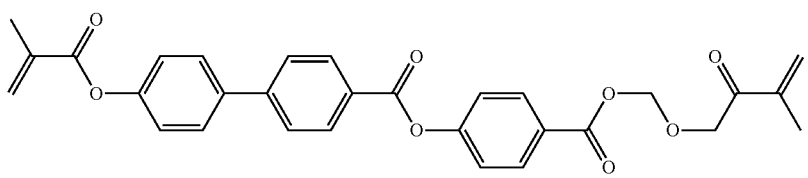

<Chemical Formula 6-2>
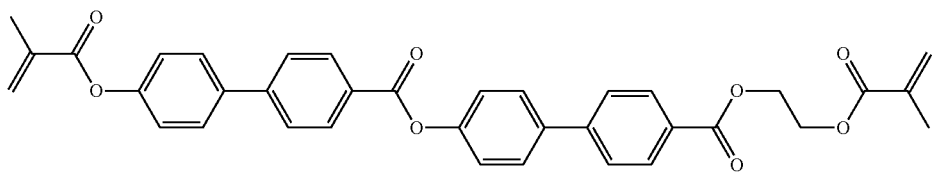

<Chemical Formula 6-3>
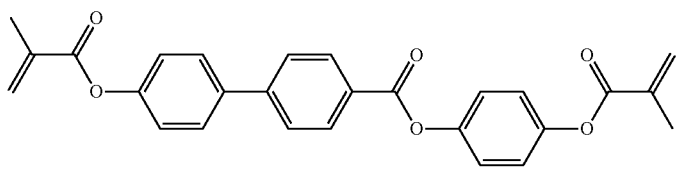

<Chemical Formula 6-4>
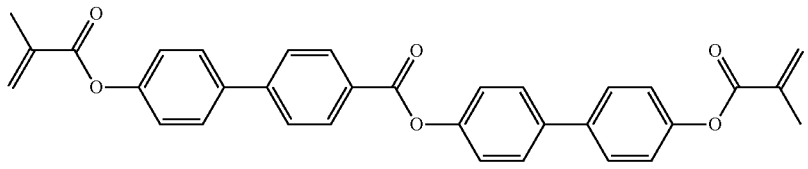

the alignment polymer includes a repeating unit represented by Chemical Formula 2, <Chemical Formula 2>
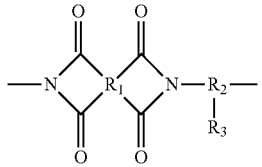

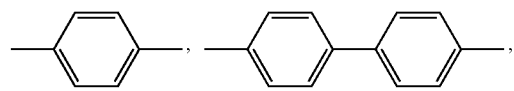
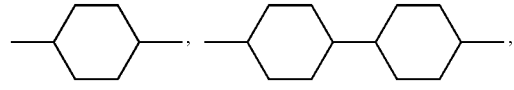

-continued

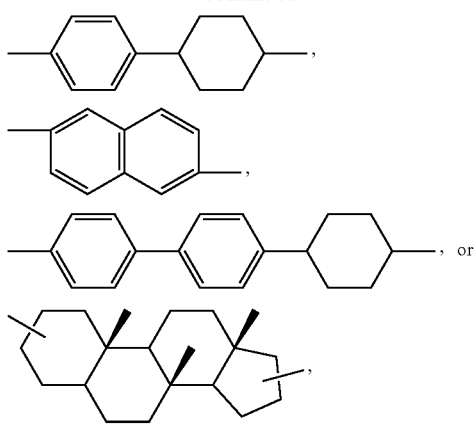

and when B1 or B2 represents an alkylene group, at least one —$CH_2$— of the alkylene group can be optionally substituted with —CH=CH— or —C≡C—, and C1 represents an alkyl group having a carbon number of 1 to 20 and having a ring shape, a chain shape or a chain shape including a side chain.

5. The liquid crystal display panel of claim 4, wherein the alignment polymer further includes a photo-reactive side chain including a photo-reactive group as an end group, the photo-reactive group representing

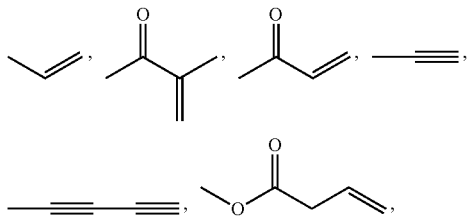

an epoxy group,

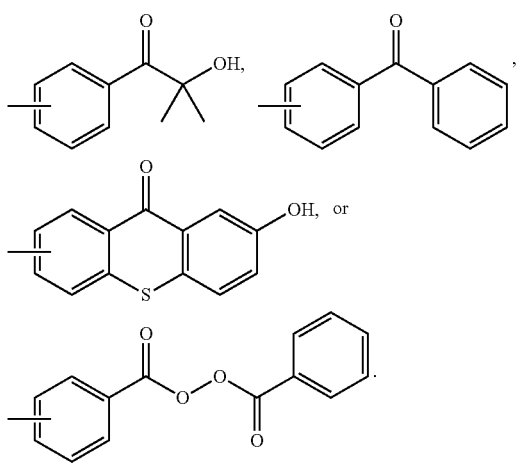

6. The liquid crystal display panel of claim 4, wherein the alignment polymer further includes a repeating unit represented by Chemical Formula 3, <Chemical Formula 3>

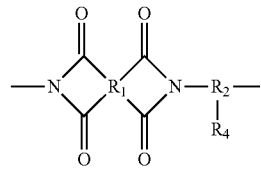

wherein $R_1$ represents a tetravalent organic group including an aromatic ring group or an aliphatic ring group, and $R_2$ represents a trivalent organic group including an alkylene group having a carbon number of 1 to 20 or an aromatic ring group or an aliphatic ring group, and $R_4$ represents -A4-B3-A5-B4-A6-D1, wherein A4, A5 and A6 independently represent a single bond,

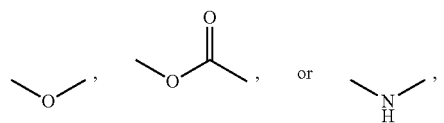

and B3 and B4 independently represent a single bond, an alkylene group having a carbon number of 1 to 20, and when B3 or B4 represents an alkylene group, at least one —$CH_2$— of the alkylene group can be optionally substituted with —CH=CH— or —C≡C—, and D1 represents

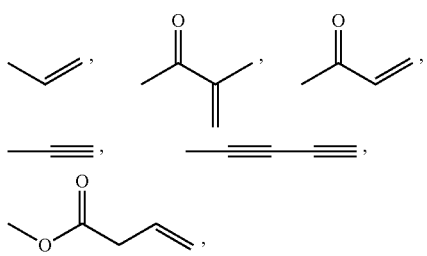

an epoxy group,

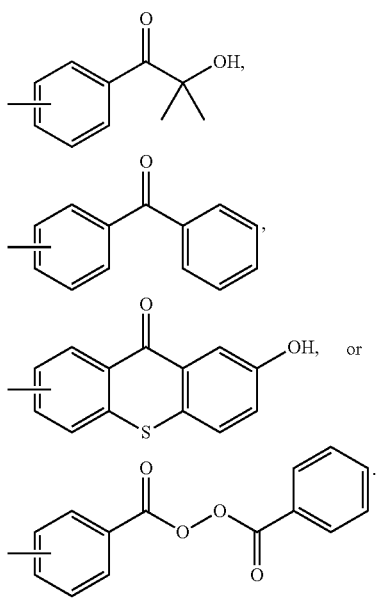

7. The liquid crystal display panel of claim 4, wherein the reactive mesogen reacts with each other to form a repeating unit represented by Chemical Formula 7, <Chemical Formula 7>

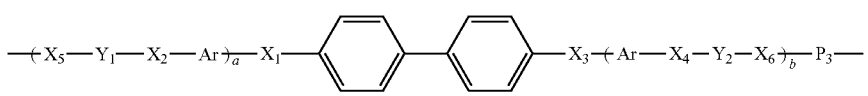

wherein, at least one hydrogen atom in

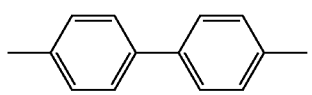

can be optionally substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group, and "a" and "b" independently represent 0, 1 or 2, and Ar represents

[structures including phenylene, biphenylene, cyclohexylene, bicyclohexylene, phenyl-cyclohexyl, naphthylene, cyclopentylene, imidazole, triazine]

and at least one hydrogen atom in a carbon ring or a hetero ring of Ar can be optionally substituted with an alkyl group having a carbon number of 1 to 20, an alkoxyl group having a carbon number of 1 to 20, a fluorine atom, a bromine atom, an amine group, a cyano group, a cycloalkyl group or a hydroxyl group, and $X_1$, $X_2$, $X_3$, $X_4$, $X_5$ and $X_6$ independently represent a single bond,

[structures: —O—, —O—C(=O)—, —NH—, —NH—C(=O)—]

$-CH_2-$, $-C=C=$ or $-C\equiv C-$, and $Y_1$ and $Y_2$ independently represent a single bond or an alkylene group having carbon atoms of 1 to 12, and $P_3$ represents an alkylene group having carbon atoms of 1 to 40, and at least one $-CH_2-$ of $P_3$ can be optionally substituted with $-CH=CH-$,

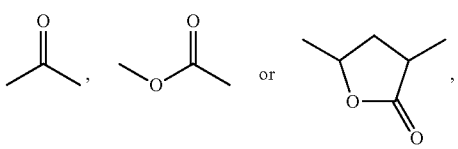

and at least one hydrogen atom of each $-CH_2-$ of $P_3$ may be substituted with $-CH_3$.

* * * * *